(12) United States Patent
Han et al.

(10) Patent No.: US 10,660,496 B2
(45) Date of Patent: May 26, 2020

(54) CLEANING ROBOT AND METHOD OF CONTROLLING THE CLEANING ROBOT

(71) Applicant: Samsung Electronics Co., Ltd, Gyeonggi-do (KR)

(72) Inventors: Seong Joo Han, Gyeonggi-do (KR); Jun Pyo Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 418 days.

(21) Appl. No.: 15/514,466

(22) PCT Filed: Sep. 24, 2015

(86) PCT No.: PCT/KR2015/010132
§ 371 (c)(1),
(2) Date: Mar. 24, 2017

(87) PCT Pub. No.: WO2016/048077
PCT Pub. Date: Mar. 31, 2016

(65) Prior Publication Data
US 2017/0273527 A1    Sep. 28, 2017

(30) Foreign Application Priority Data

Sep. 24, 2014  (KR) .................. 10-2014-0127946
Sep. 24, 2015  (KR) .................. 10-2015-0135897

(51) Int. Cl.
*A47L 9/28* (2006.01)
*G01C 21/20* (2006.01)
(Continued)

(52) U.S. Cl.
CPC ............. *A47L 9/2805* (2013.01); *A47L 9/009* (2013.01); *A47L 9/2852* (2013.01);
(Continued)

(58) Field of Classification Search
CPC ...... A47L 9/009; A47L 9/2852; A47L 9/2857; B25J 9/1664; B25J 13/006; B25J 13/086;
(Continued)

(56) References Cited

U.S. PATENT DOCUMENTS 7,554,282 B2 *   6/2009   Nakamoto ................ B25J 5/00
                                                          318/587
7,957,837 B2 *   6/2011   Ziegler ................... B25J 5/007
                                                          700/258
(Continued)

FOREIGN PATENT DOCUMENTS

CN         1381340 A      11/2002
CN       101101203 A       1/2008
(Continued)

OTHER PUBLICATIONS

Foreign Communication from Related Counterpart Application; European Patent Application No. 15843361.5; Extended European Search Report and European search opinion dated Mar. 7, 2018; 6 pages.
(Continued)

*Primary Examiner* — Thomas G Black
*Assistant Examiner* — Luat T Huynh

(57) ABSTRACT

A cleaning robot is provided. The cleaning robot includes a sensor configured to sense obstacle information, and a controller configured to generate a map based on sensed values obtained by the sensor, analyze a structure of the generated map by detecting a region segmentation point from the map, and generate a map image based on an analysis result.

19 Claims, 27 Drawing Sheets

(51) Int. Cl.
*A47L 9/00* (2006.01)
*H04Q 9/00* (2006.01)
*G01C 21/00* (2006.01)
*G05D 1/00* (2006.01)
*B25J 9/16* (2006.01)
*B25J 13/00* (2006.01)
*B25J 13/08* (2006.01)
*H04M 1/725* (2006.01)

(52) U.S. Cl.
CPC ........... *A47L 9/2857* (2013.01); *B25J 9/1664* (2013.01); *B25J 13/006* (2013.01); *B25J 13/086* (2013.01); *B25J 13/089* (2013.01); *G01C 21/005* (2013.01); *G01C 21/206* (2013.01); *G05D 1/0044* (2013.01); *H04Q 9/00* (2013.01); *A47L 2201/04* (2013.01); *A47L 2201/06* (2013.01); *G05D 2201/0203* (2013.01); *H04M 1/72533* (2013.01)

(58) Field of Classification Search
CPC .... B25J 13/089; G01C 21/005; G01C 21/206; G05D 1/0044
USPC .......................................................... 701/23
See application file for complete search history.

(56) References Cited

U.S. PATENT DOCUMENTS

| | | | | |
|---|---|---|---|---|
| 8,543,241 | B2* | 9/2013 | Hong | B25J 9/0003 318/568.12 |
| 8,843,245 | B2* | 9/2014 | Choe | G05D 1/0246 700/214 |
| 8,983,661 | B2* | 3/2015 | Cho | A47L 9/2805 700/257 |
| 2002/0153184 | A1 | 10/2002 | Song et al. | |
| 2004/0167688 | A1* | 8/2004 | Karlsson | G01C 21/12 701/23 |
| 2006/0095170 | A1* | 5/2006 | Yang | G05D 1/0246 701/23 |
| 2006/0293810 | A1* | 12/2006 | Nakamoto | G05D 1/0234 701/28 |
| 2007/0271003 | A1* | 11/2007 | Bang | G05D 1/0272 700/245 |
| 2008/0273791 | A1* | 11/2008 | Lee | G06K 9/00771 382/153 |
| 2009/0182464 | A1* | 7/2009 | Myeong | G05D 1/0246 701/25 |
| 2013/0060379 | A1 | 3/2013 | Choe et al. | |
| 2014/0058610 | A1* | 2/2014 | Sofman | G05D 1/0274 701/23 |
| 2016/0057925 | A1* | 3/2016 | Letsky | A01D 34/008 701/23 |

FOREIGN PATENT DOCUMENTS

| | | |
|---|---|---|
| EP | 2078996 A2 | 7/2009 |
| EP | 2508957 A2 | 10/2012 |
| KR | 100791384 B1 | 1/2008 |
| KR | 1020090077547 A | 7/2009 |
| KR | 1020130027349 A | 3/2013 |
| KR | 1020130092729 A | 8/2013 |
| KR | 1020130120307 A | 11/2013 |

OTHER PUBLICATIONS

International Search Report dated Dec. 28, 2015 in connection with International Applicaiton No. PCT/KR2015/010132, 3 pages.
Written Opinion of the International Searching Authority dated Dec. 28, 2015 in connection with International Applicaiton No. PCT/KR2015/010132, 8 pages.
Examination Report No. 1 for Standard Patent Application, dated Nov. 3, 2017, regarding Australian Patent Application No. 2015322263, 4 pages.
China National Intellectual Property Administration, "Notification of the First Office Action," Application No. CN 2019092301866200, dated Sep. 26, 2019, 13 pages.

* cited by examiner

[Fig. 1]
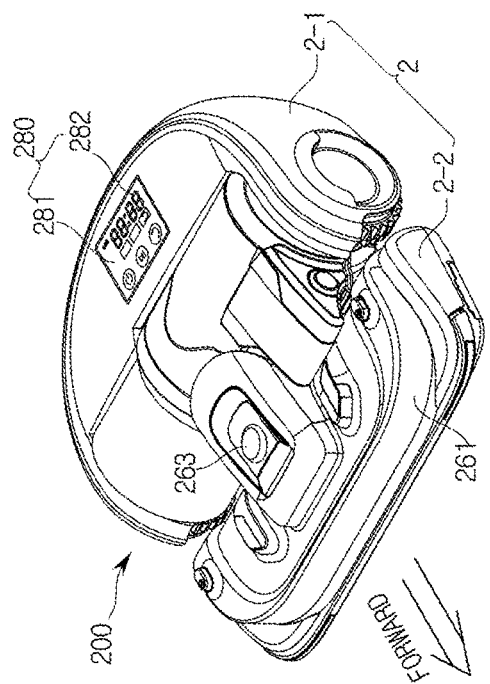

[Fig. 2a]
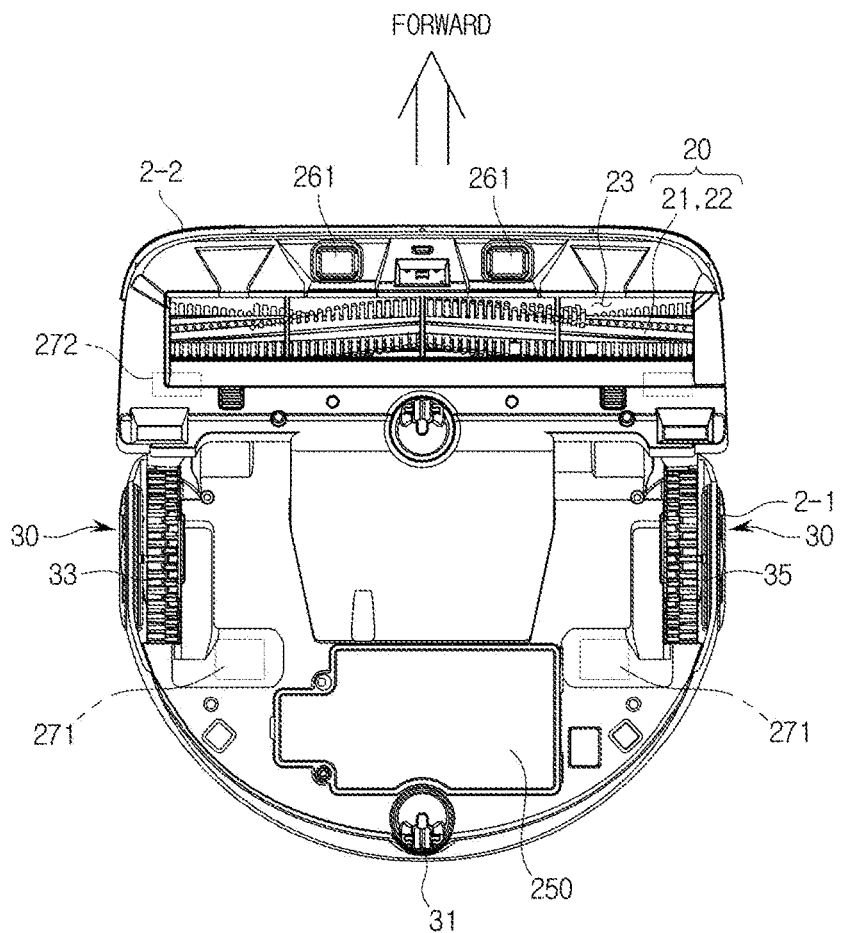
[Fig. 2b]
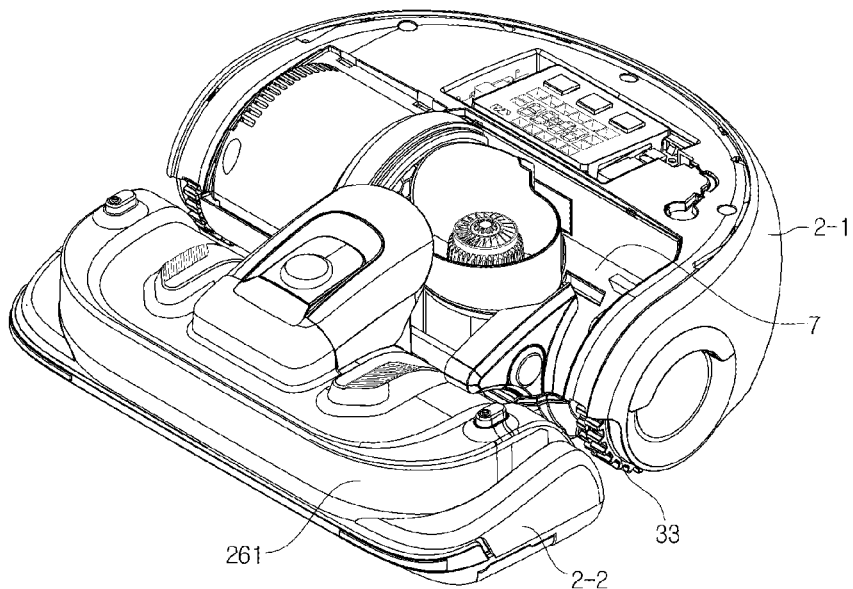

[Fig. 3]
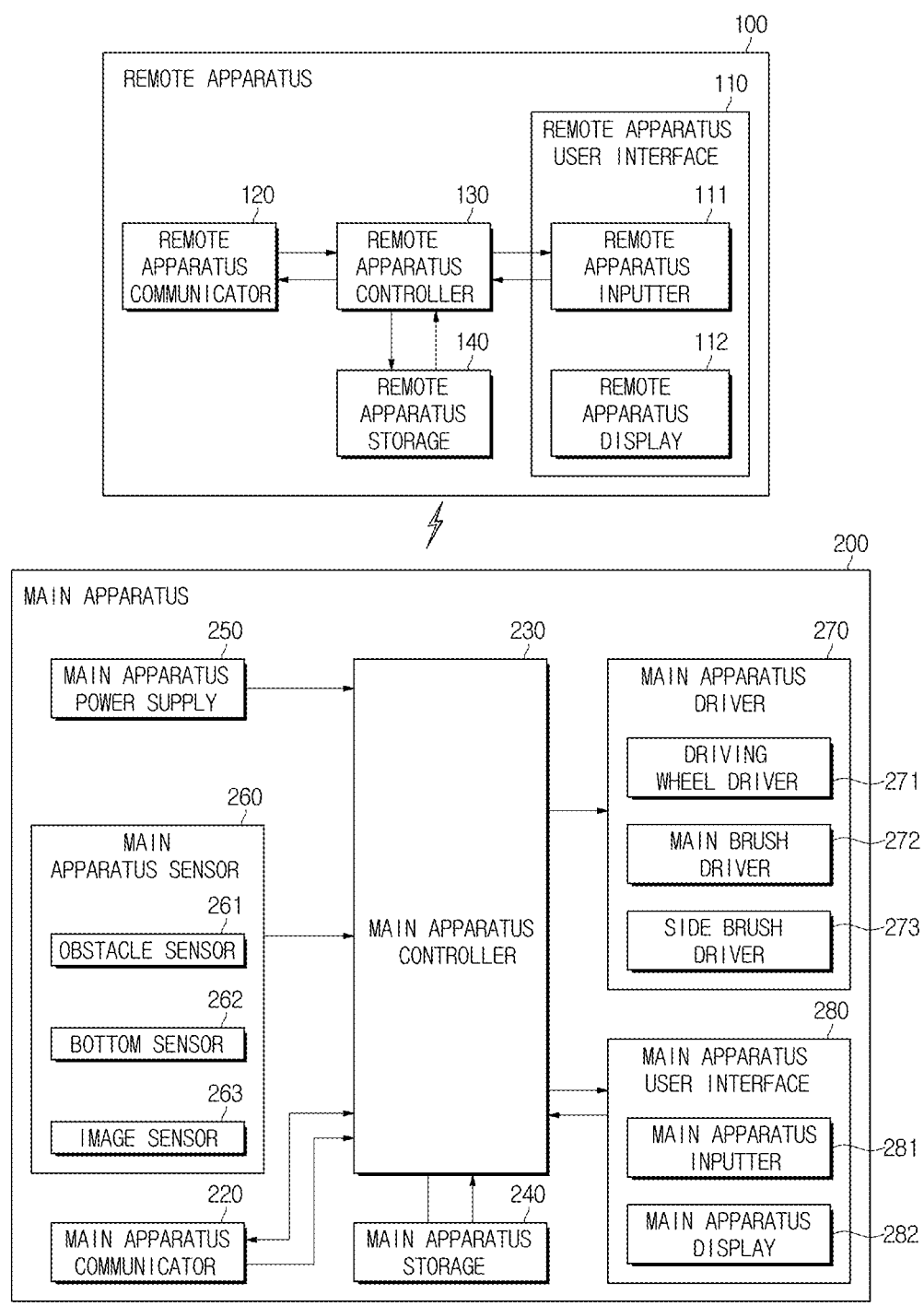

[Fig. 4a]
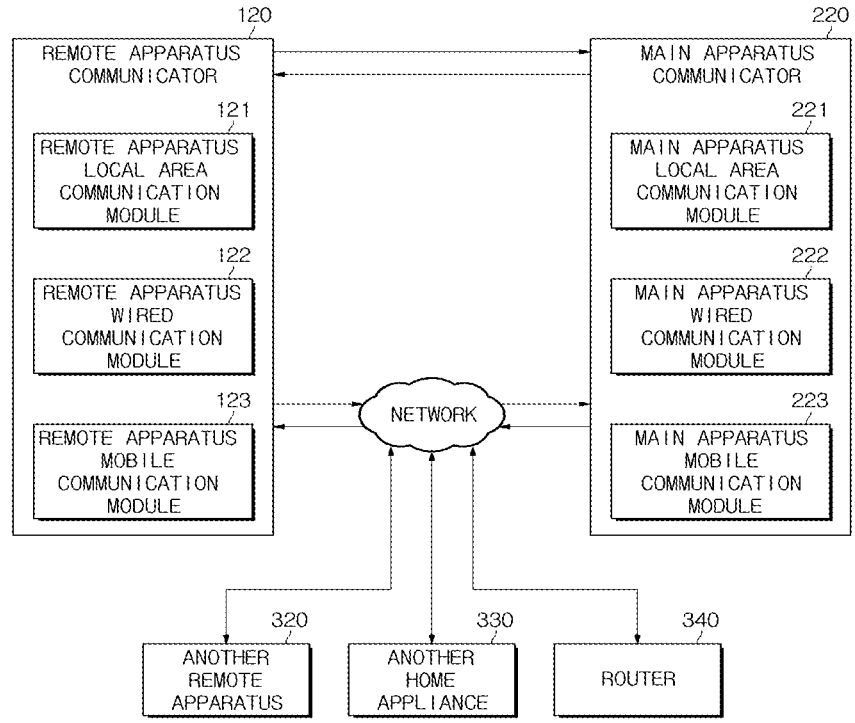
[Fig. 4b]
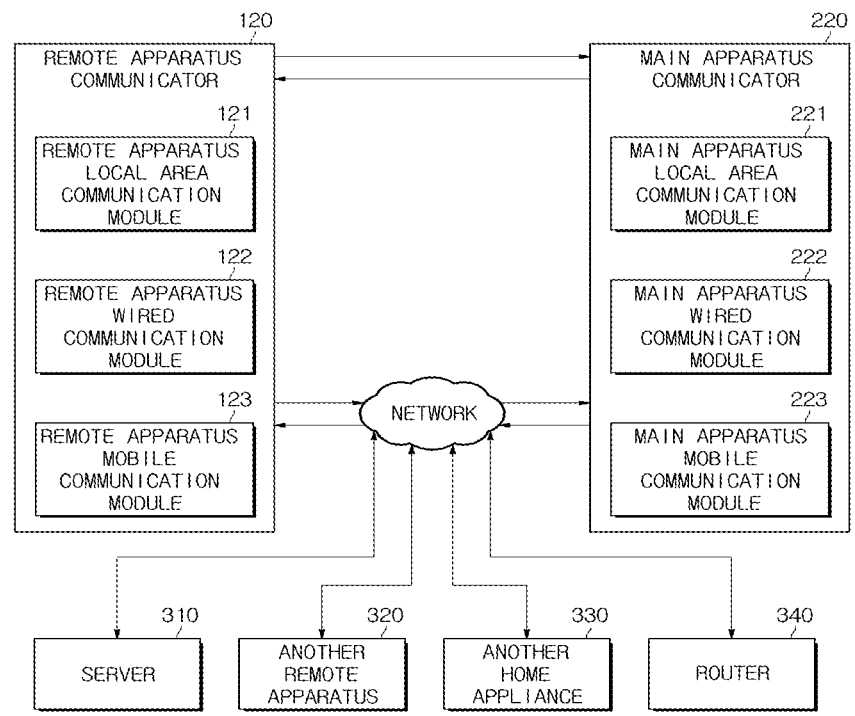

[Fig. 5]
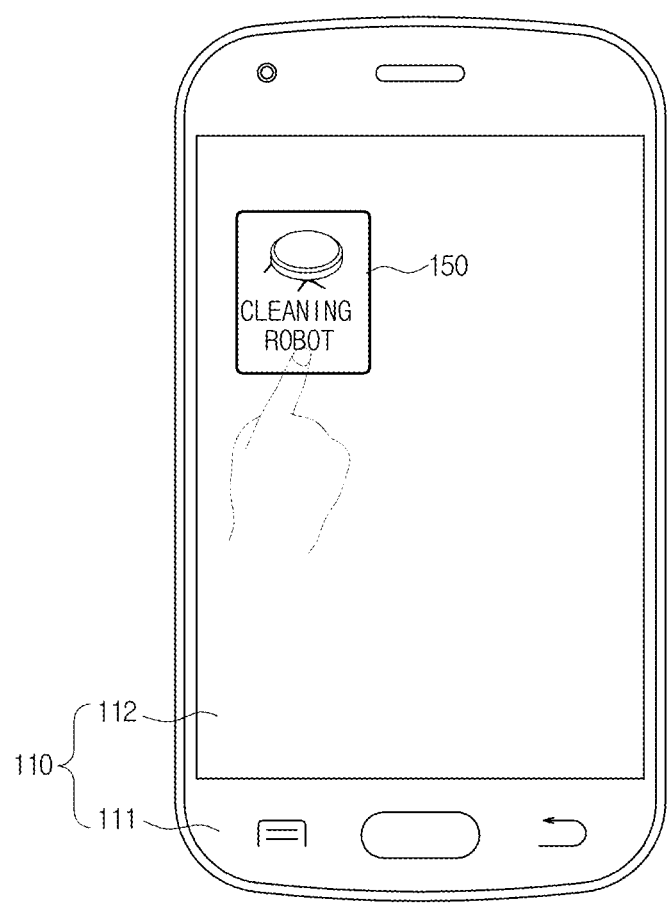

[Fig. 6]
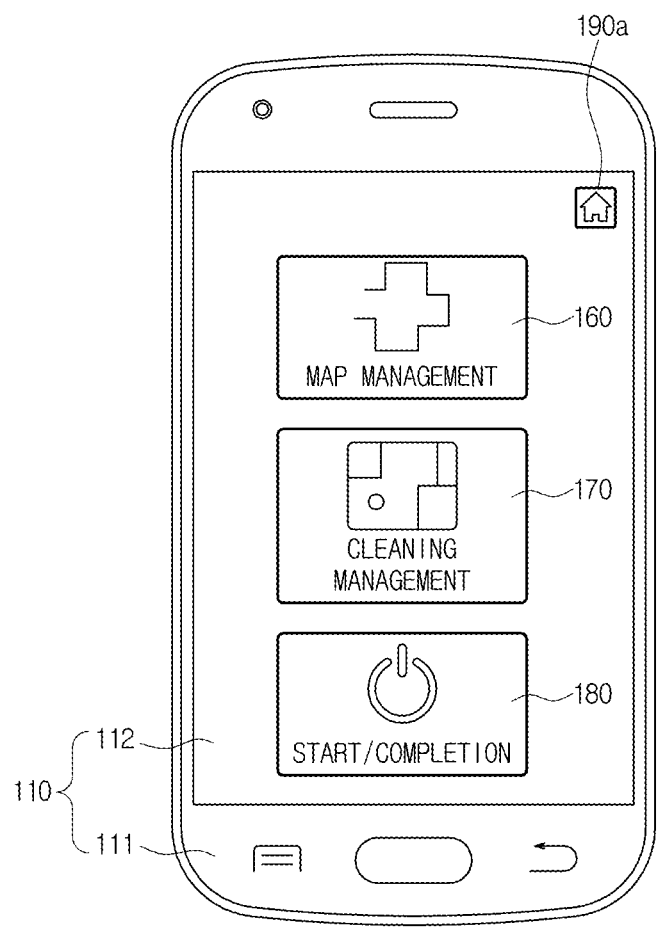

[Fig. 7a]
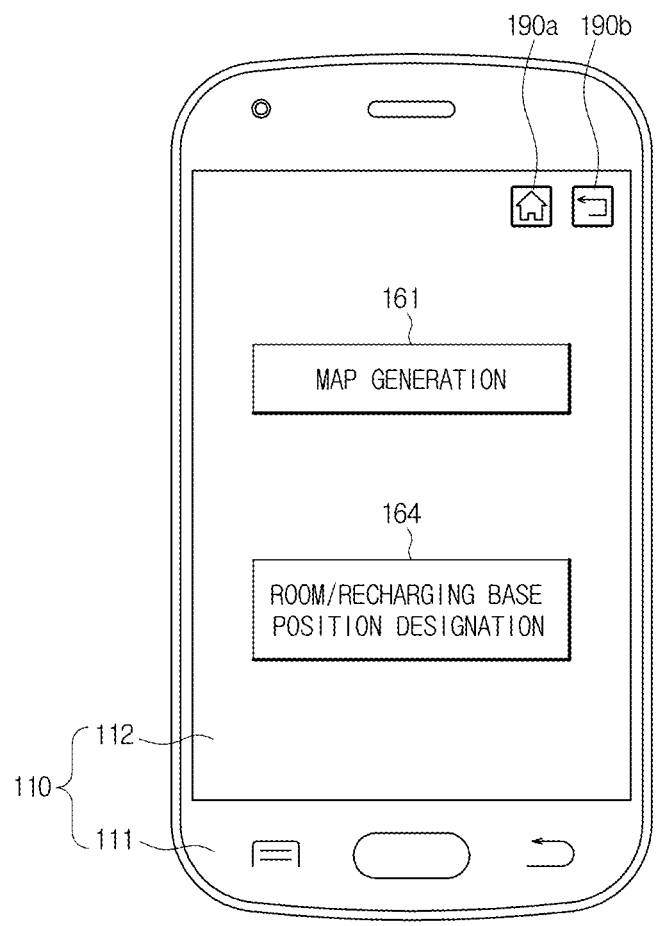

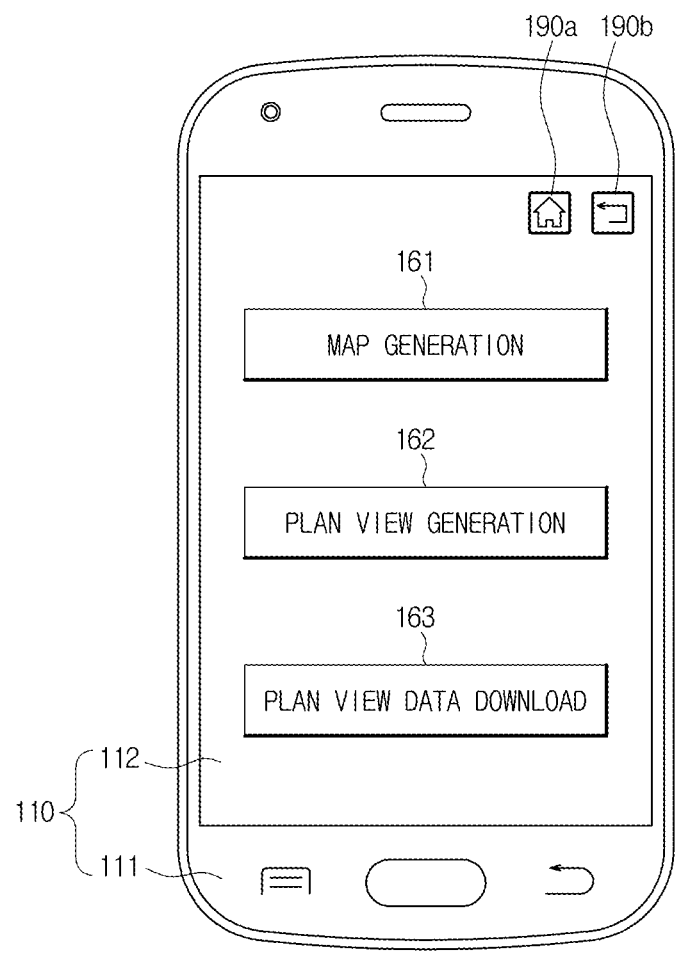
[Fig. 7b]

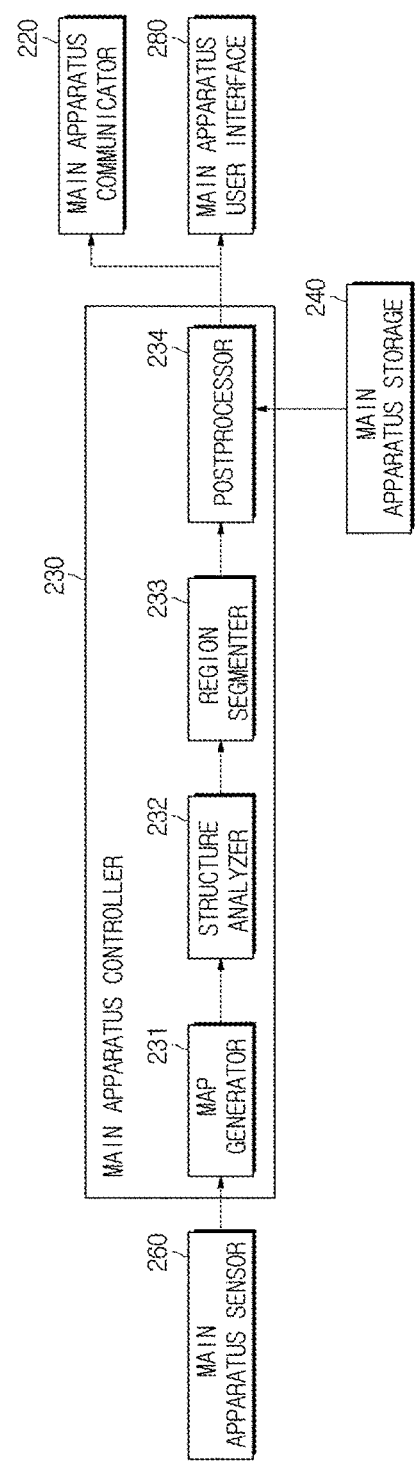
[Fig. 8a]

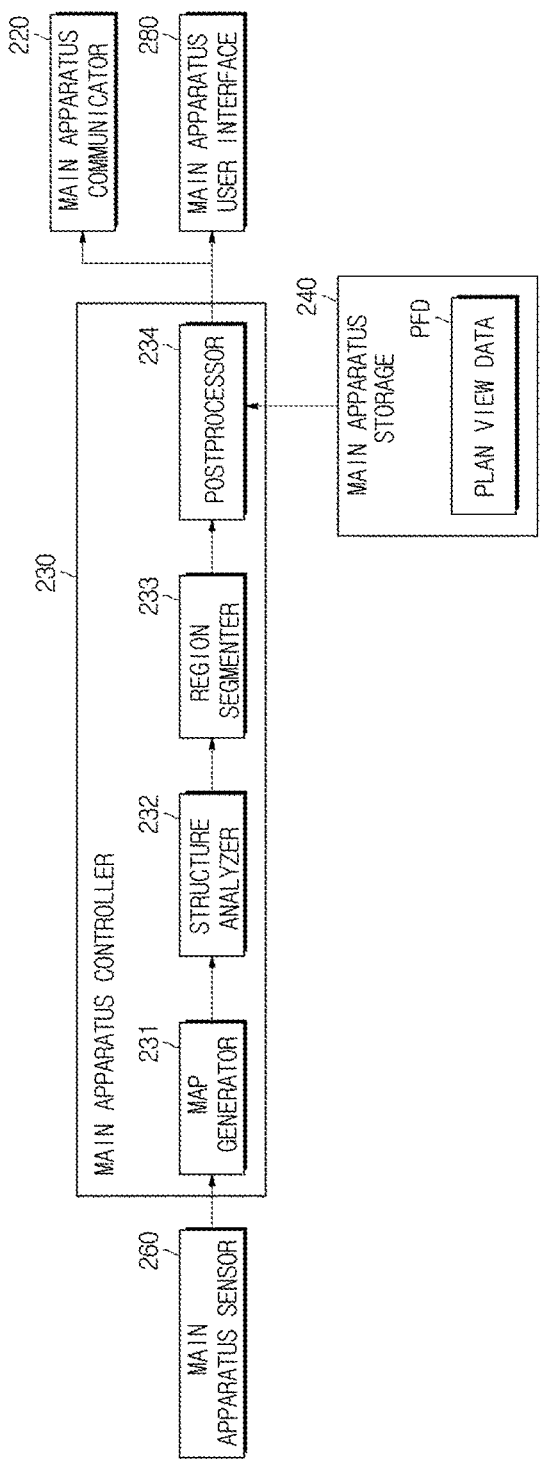
[Fig. 8b]

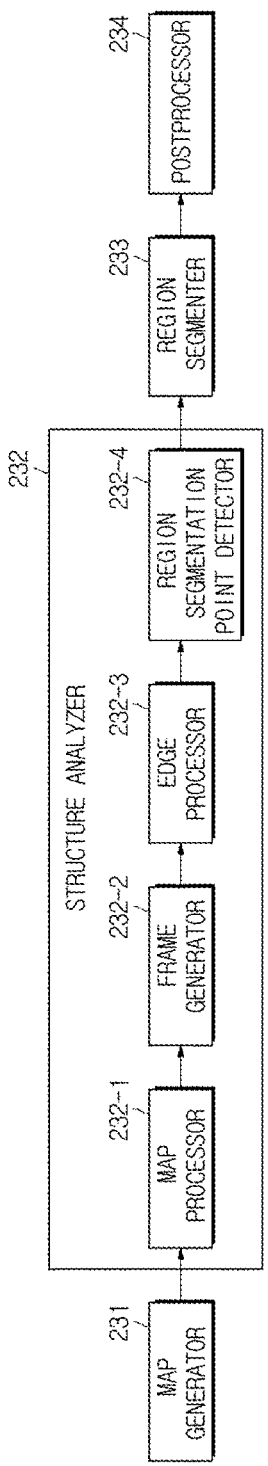
[Fig. 9]

[Fig. 10]
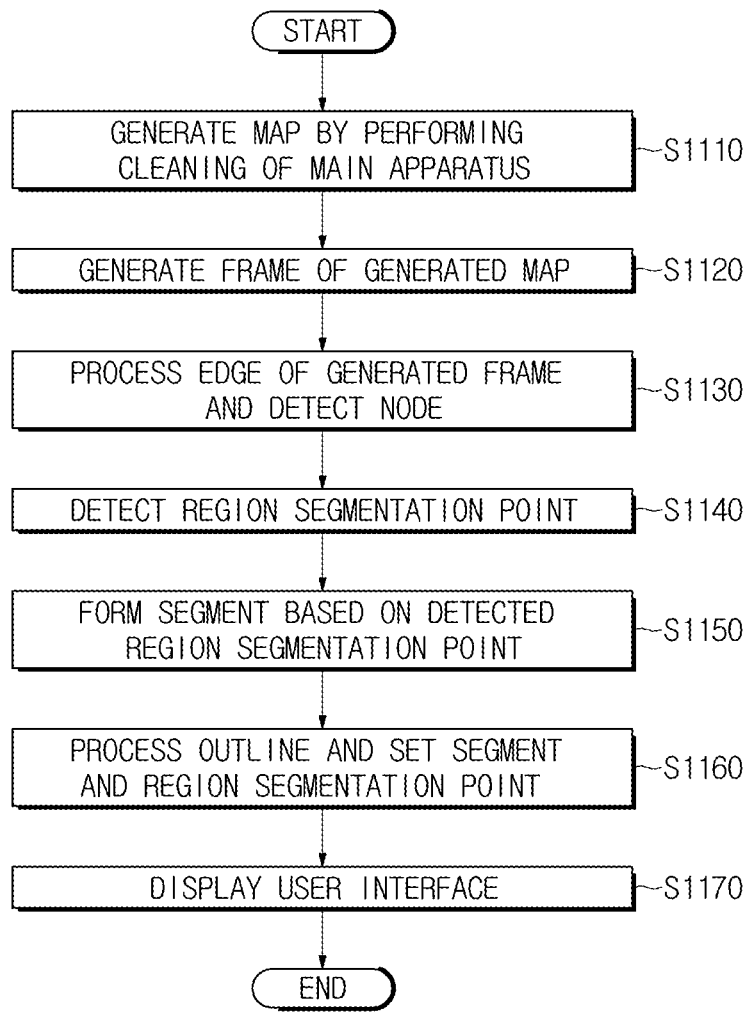

[Fig. 11]
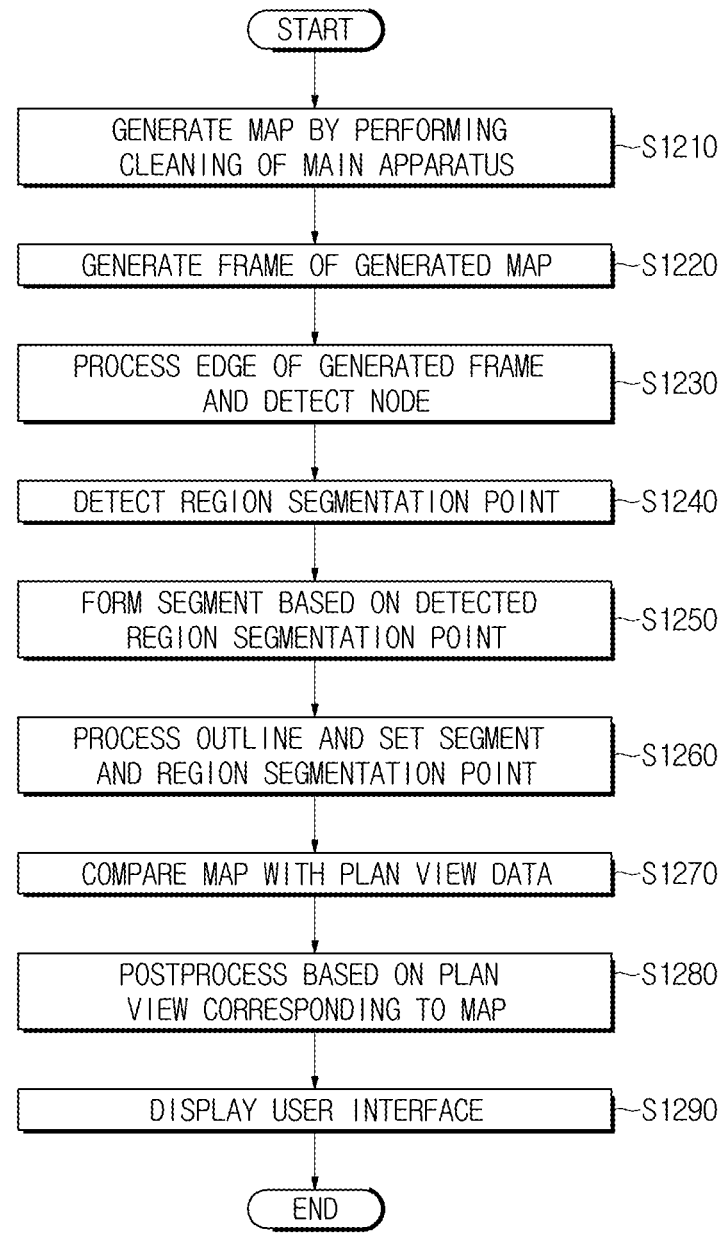

[Fig. 12]
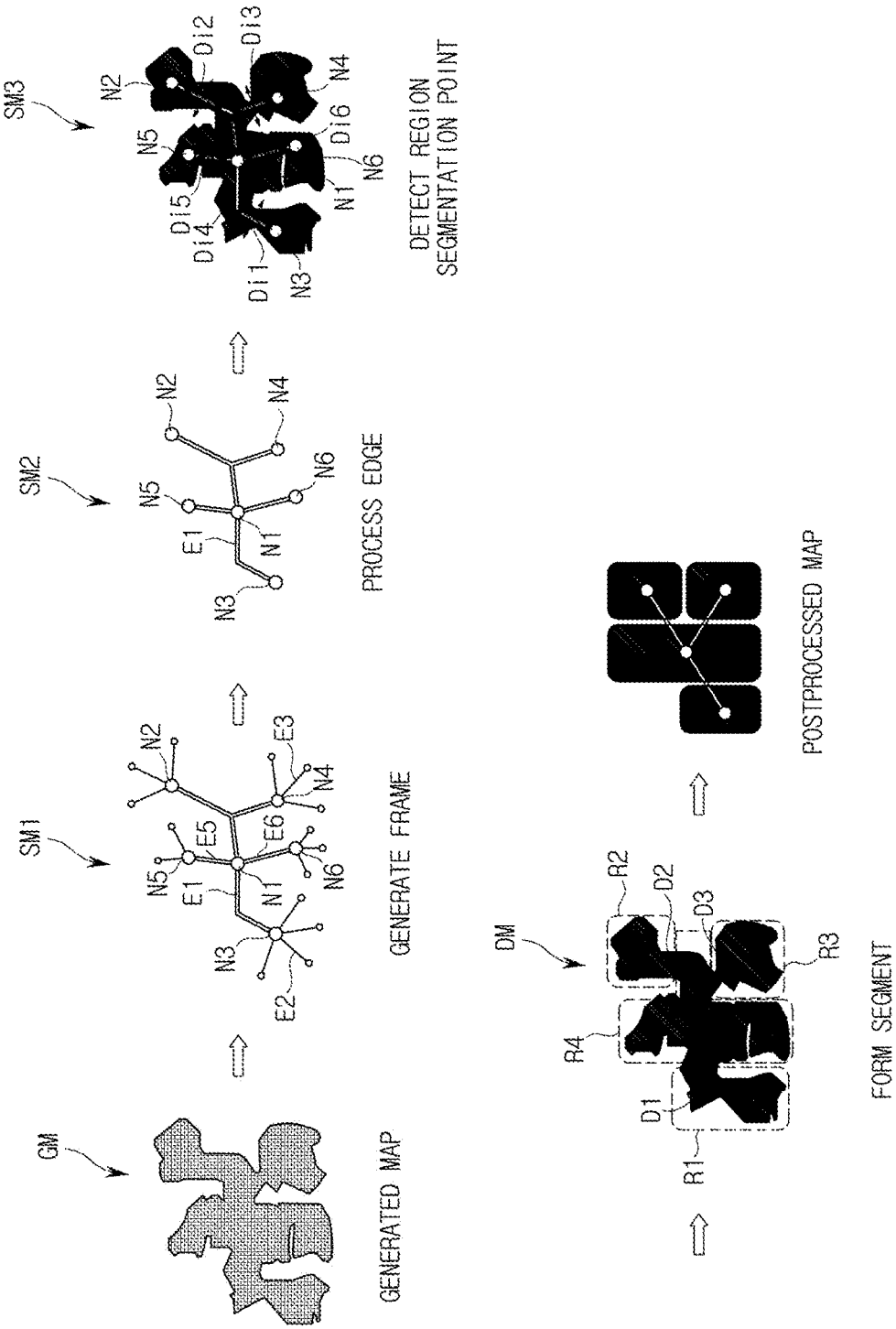

[Fig. 13]
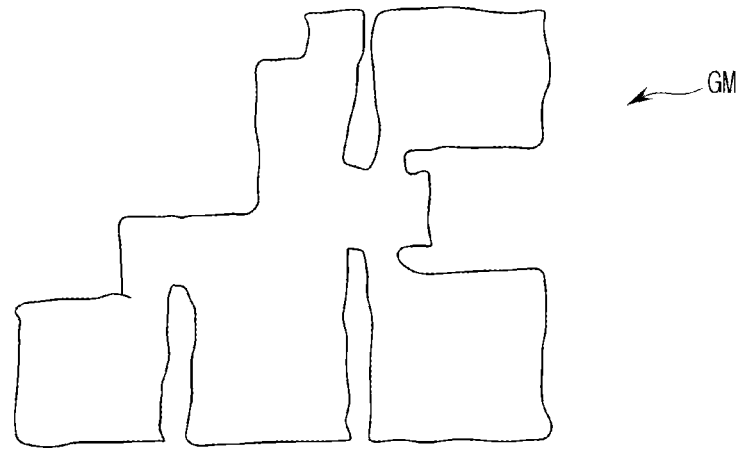
(a)
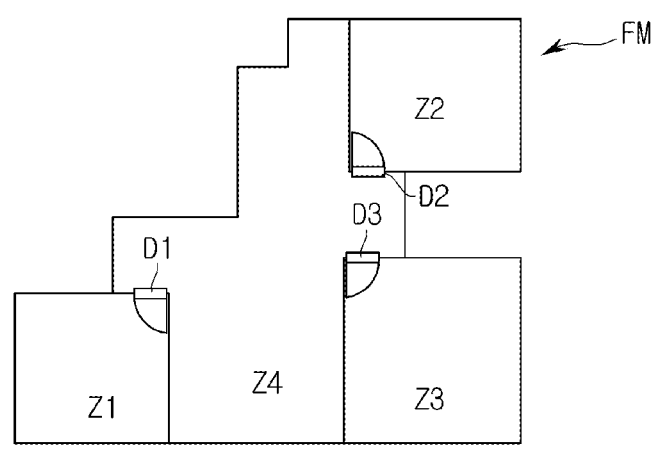
(b)

[Fig. 14]
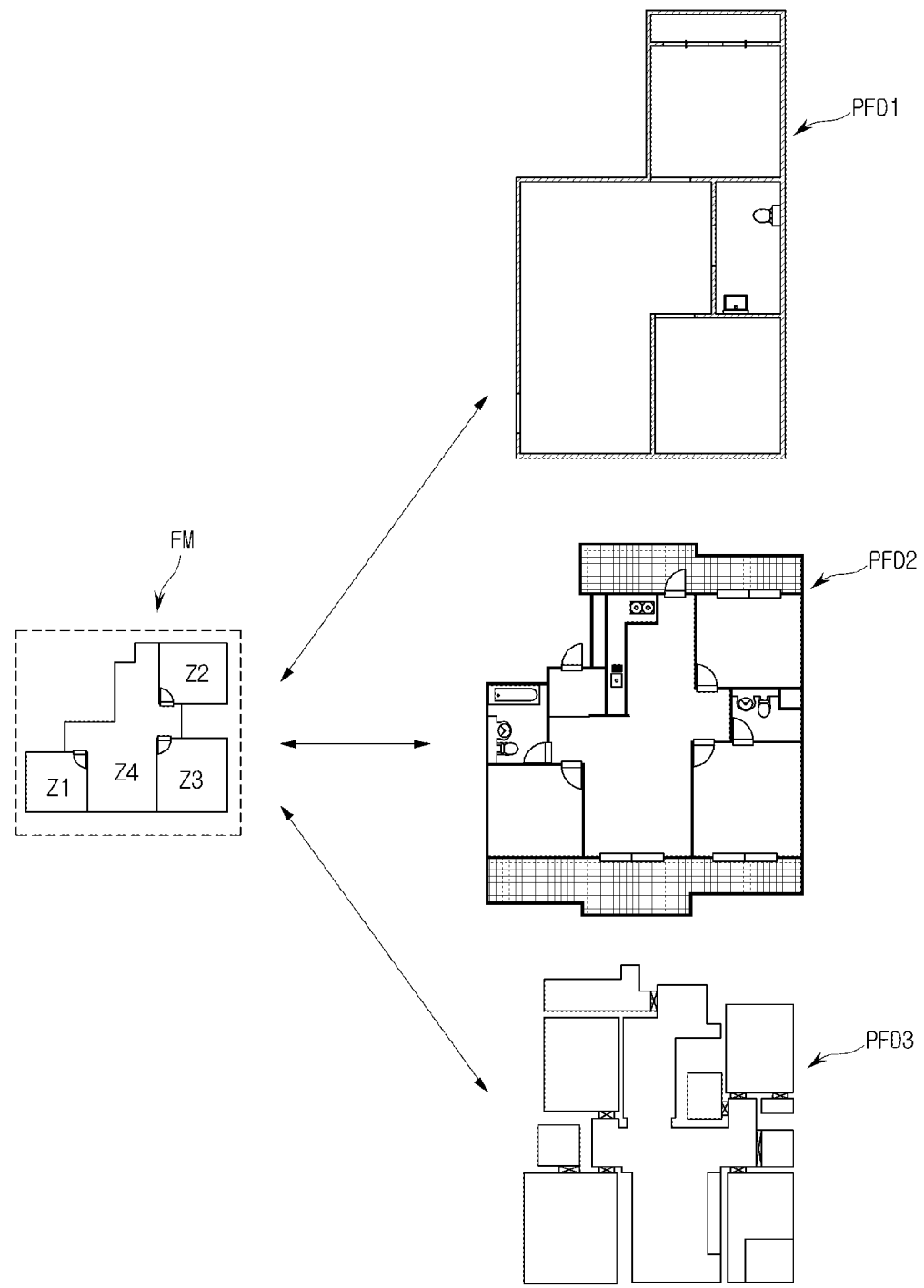

[Fig. 15]
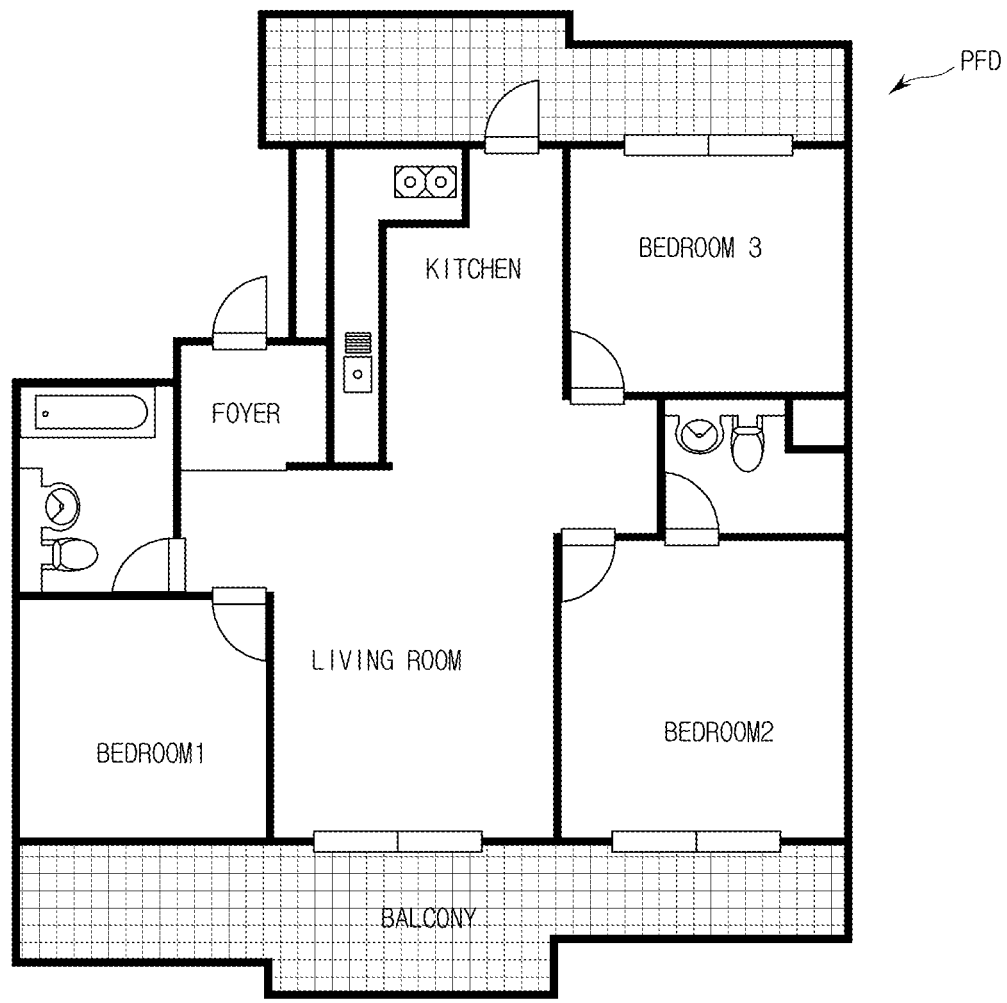

[Fig. 16]
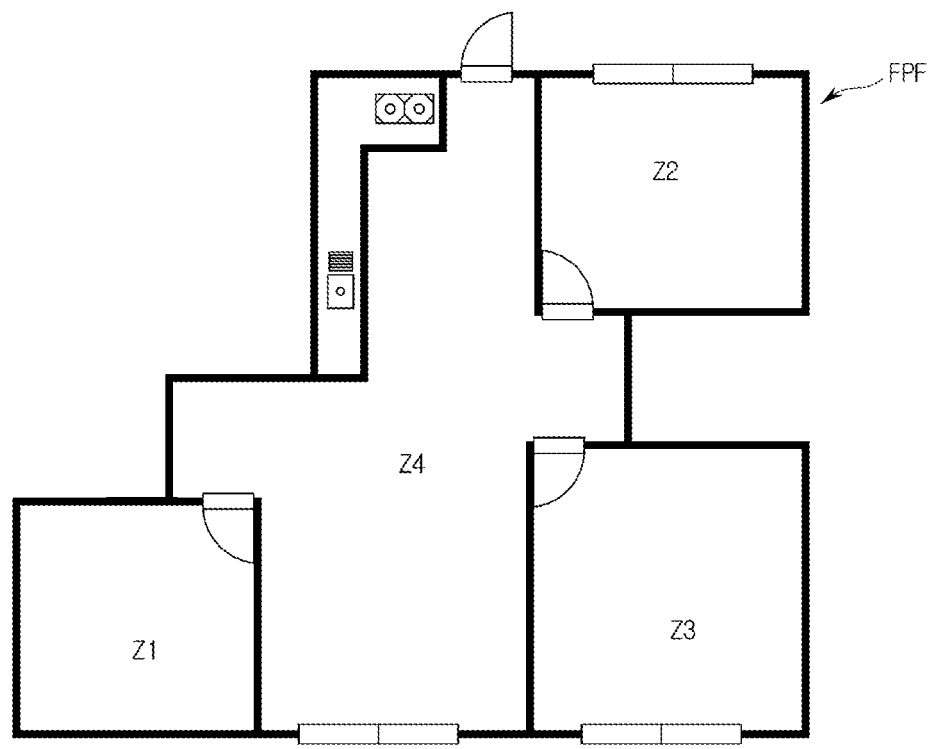

[Fig. 19a]
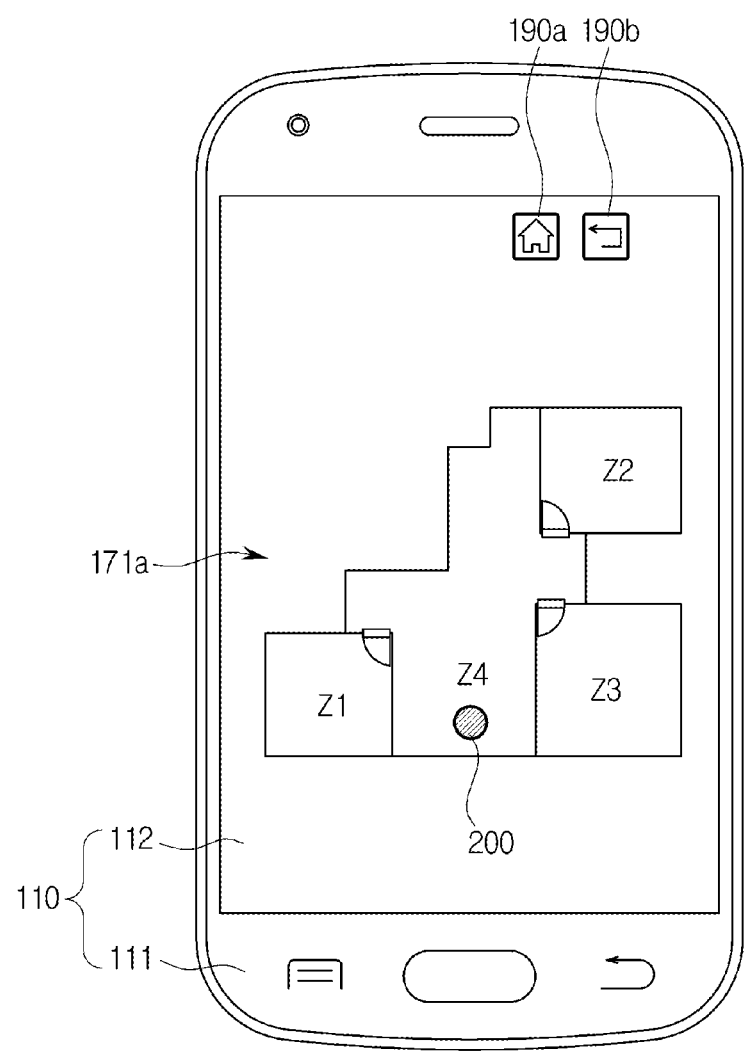

[Fig. 19b]
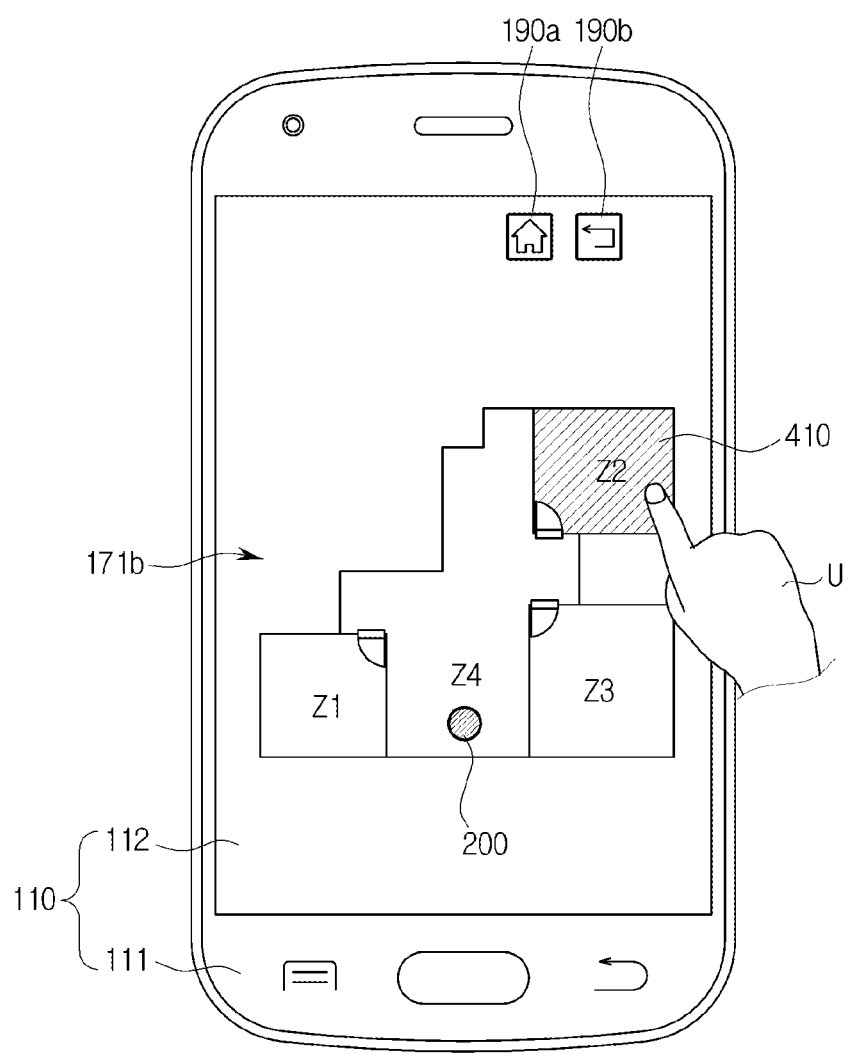

[Fig. 19c]
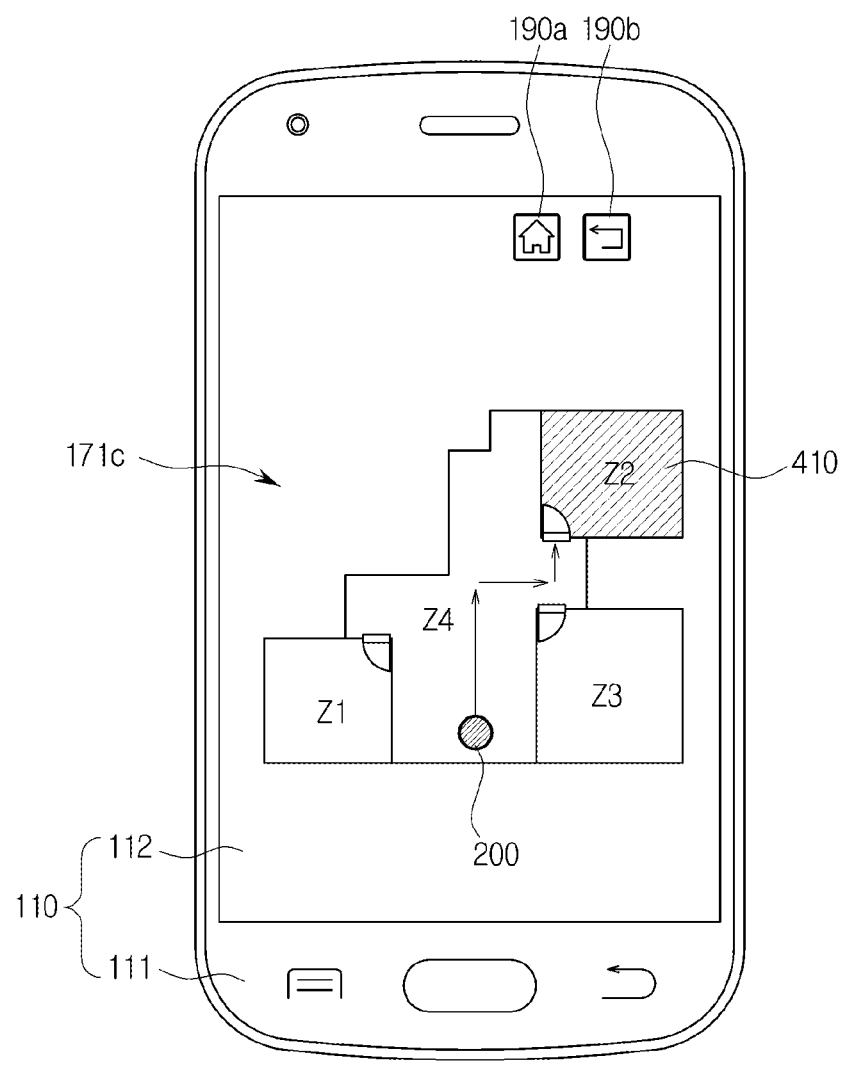

[Fig. 20a]
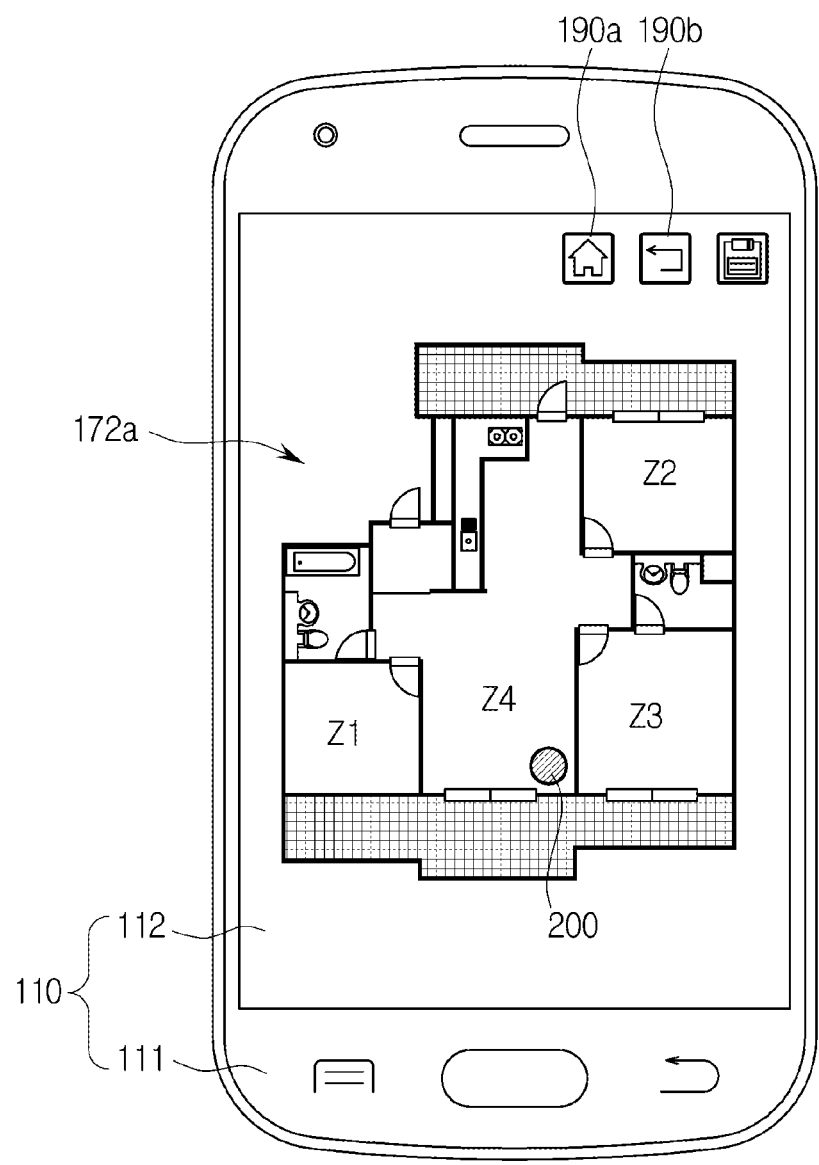

[Fig. 20b]
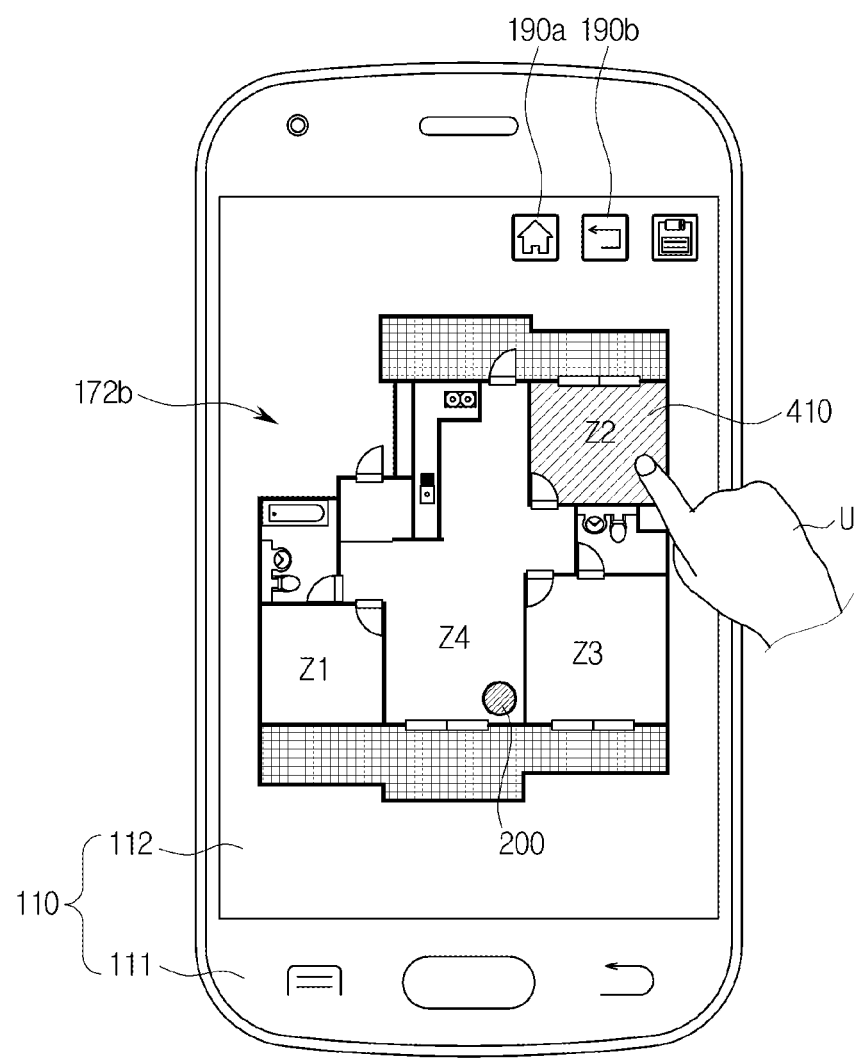

[Fig. 20c]
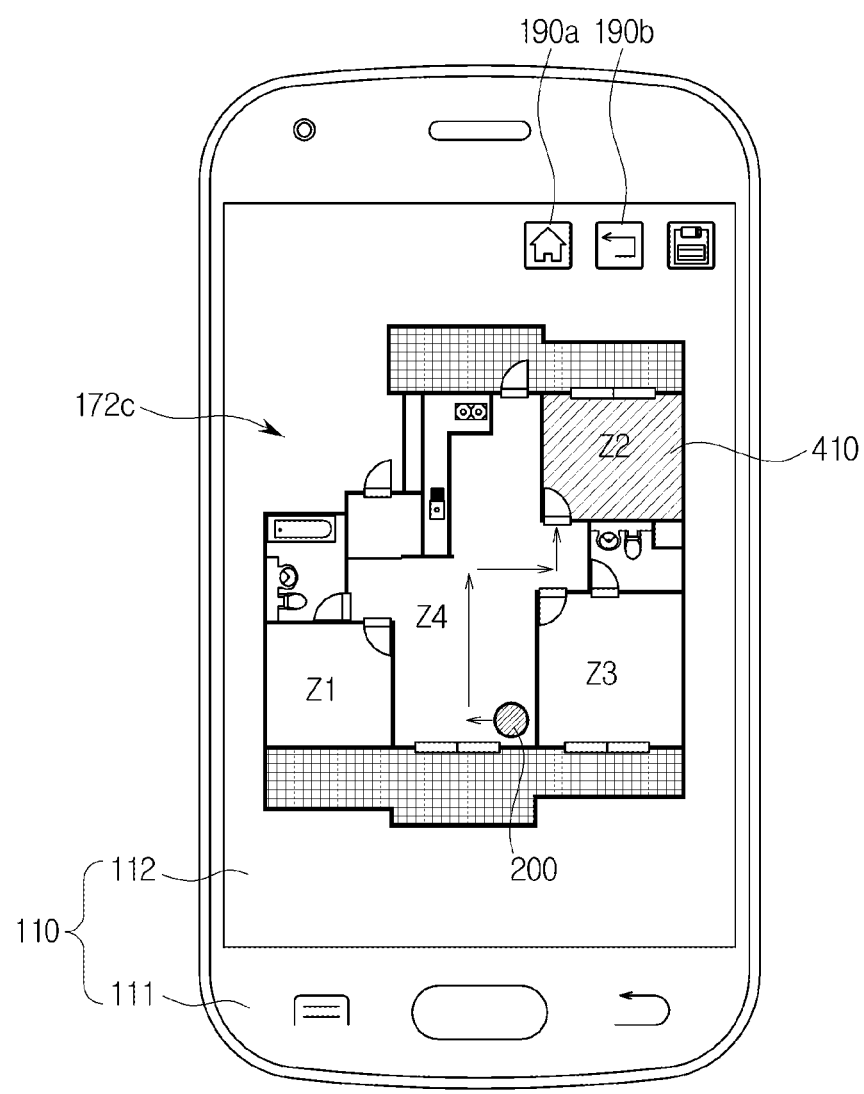

[Fig. 21]
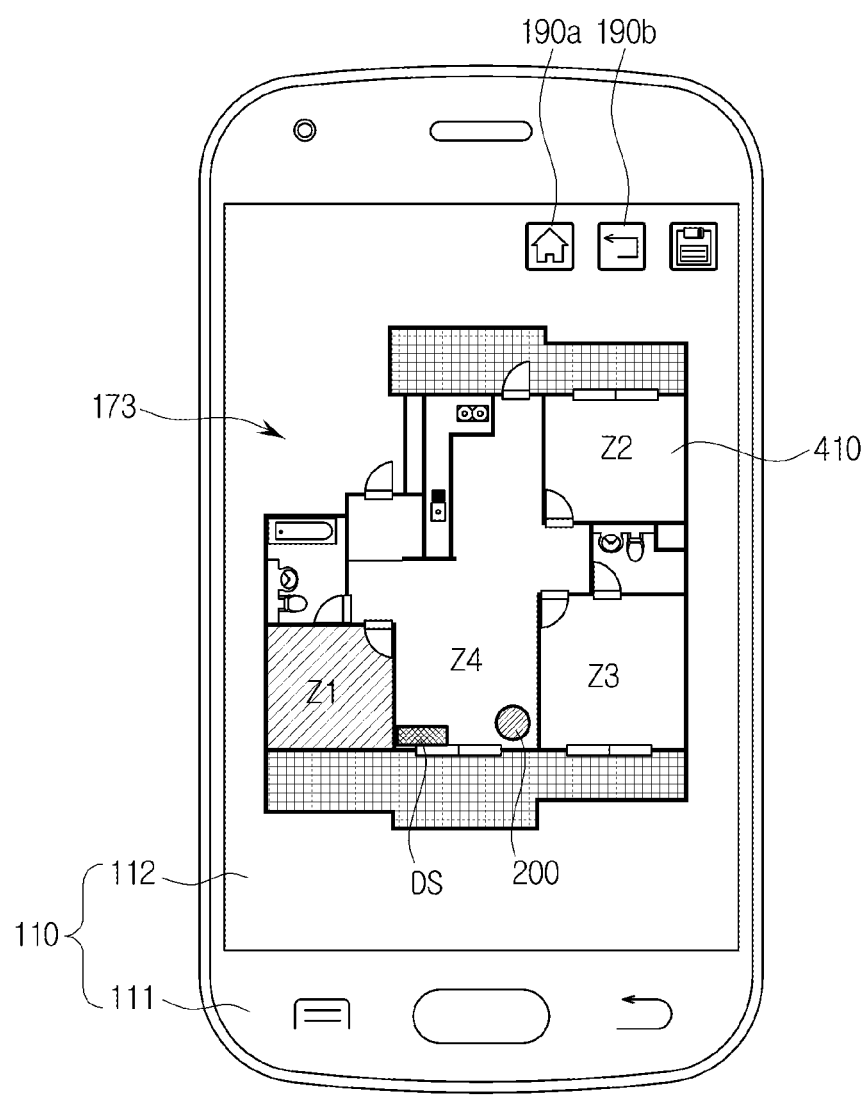

CLEANING ROBOT AND METHOD OF CONTROLLING THE CLEANING ROBOT

CROSS-REFERENCE TO RELATED APPLICATION(S)

The present application claims priority under 35 U.S.C. § 365 to International Patent Application No. PCT/KR2015/010132 filed Sep. 24, 2015, entitled "ROBOT AND METHOD OF CONTROLLING THE CLEANING ROBOT", and, through International Patent Application No. PCT/KR2015/010132, to Korean Patent Application No. 10-2014-0127946 filed Sep. 24, 2014, and to Korean Patent Application No. 10-2015-0135897 filed Sep. 24, 2015, each of which are incorporated herein by reference into the present disclosure as if fully set forth herein.

TECHNICAL FIELD

Embodiments of the present invention relate to a cleaning robot configured to display a map including obstacle information as an image and a method of controlling the same.

BACKGROUND ART

A cleaning robot is an apparatus that automatically cleans a target space by absorbing foreign substances such as dust stacked on a floor while moving over the target space without being operated by a user. That is, the cleaning robot cleans the target space while moving over the target space.

A conventional cleaning robot displays the whole structure in a house in which the cleaning robot is positioned through a correction to a map including obstacle information, or a user sets and displays a map of the house at the cleaning robot in advance.

However, in the case of displaying through the correction to the map, the user has a difficulty in intuitionally recognize the structure of the house and the position of the cleaning robot. When the user sets the map of the house in advance, there is a difficulty in displaying a current position of the cleaning robot and adapting a change in position of an obstacle.

Accordingly, such research for increasing intuition of the user by displaying a space in which a cleaning robot is positioned has been actively performed.

Also, in the case of a conventional cleaning robot, when a user would like to clean a particular place among a target space, it is necessary that the user personally checks a position of the cleaning robot and moves the cleaning robot to the particular position using a remote controller.

However, when the user does not know the position of the cleaning robot, the user should find the cleaning robot and has a difficulty in finding the cleaning robot when the cleaning robot is cleaning under a sofa, bed or the like.

Also, the user is put to an inconvenience of personally operating movements of the cleaning robot using the remote controller to move the cleaning robot to the particular position.

Also, when the cleaning robot is moved to the particular position using a dragging function, it is necessary to output an optical signal that the cleaning robot follows until the cleaning robot is moved to the particular position.

Accordingly, recently, a method of moving a cleaning robot to a particular position without such inconvenience has been actively researched.

DISCLOSURE OF INVENTION

Technical Problem

An aspect of the present invention provides a cleaning robot configured to generate and display a simplified shaped map including a plurality of segments by analyzing a structure of a map and a method of controlling the cleaning robot.

Technical Solution

According to an aspect of an exemplary embodiment, a cleaning robot includes a sensor configured to sense obstacle information, and a controller configured to generate a map based on sensed values obtained by the sensor, analyze a structure of the generated map by detecting a region segmentation point from the map, and generate a map image based on an analysis result.

The controller may determine a plurality of segments included in the map by analyzing the structure of the map, substitute each of the segments with a figure, and generate the map image by combining a plurality of figures corresponding to the plurality of segments.

The controller may detect the region segmentation point based on a width of a section formed by one or more pixels.

The controller may detect the region segmentation point based on a width of a section formed by one or more pixels displayed as not having an obstacle while moving a detection point along a frame edge from a branch node to a leaf node among a frame of the map along a frame edge.

While moving the detection, the controller may detect the detection point as the region segmentation point when the one or more pixels displayed as not having the obstacle forms a section having a width less than a reference value.

While moving the detection point, when the one or more pixels displayed as not having the obstacle passes from the section having the width less than the reference value to a section having a width of the reference value or more, the controller may detect a detection point corresponding to the section having the width less than the reference value as the region segmentation point.

The controller may determine a width in at least one of a horizontal direction, a perpendicular direction, and an arbitrary angular direction of the one or more pixels as the width of the section based on a movement direction of the detection point.

The controller may determine a width in at least one of a horizontal direction, a perpendicular direction, and an arbitrary angular direction of the one or more pixels as the width of the section based on the detection point.

The controller may form the frame of the map and move the detection point outward from a center of the frame.

The controller may include a structure analyzer that includes a frame generator configured to form a frame of the map, an edge processor configured to remove an unnecessary edge of one or more edges included in the frame and distinguish a central node of the frame from another node, and a region segmentation point detector configured to detect the region segmentation point formed between the central node and the other nodes based on a processing result of the edge processor and the sensed values of the sensor.

When the region segmentation point is detected, the region segmentation point detector may distinguish one or more pixels formed toward the other nodes from the region segmentation point as one segment.

The cleaning robot may further include a map processor configured to arrange an external shape of the map uniform.

The controller may further include a region segmenter configured to determine a plurality of segments included in the map based on the structure of the map analyzed by the structure analyzer.

The controller may further include a postprocessor configured to substitute each of the segments with a preset figure based on information with respect to the segments.

The controller may detect a plan view corresponding to the generated map image and generate another map image based on the corresponding plan view.

According to an aspect of another exemplary embodiment, a cleaning robot includes a storage in which at least one program is stored and a controller configured to display a map image by executing the at least one program. The at least one program includes commands for executing operations of: receiving a map generation command input from a user, receiving a map image from a main apparatus, and displaying the map image. The map image includes information on a region segmentation point and a segment generated based on a result of detecting an obstacle by the main apparatus.

The map image may include a combination of preset figures.

The displaying of the map image may include displaying a position of the main apparatus.

The at least one program may further include a command for executing an operation of receiving a selection of a user about a random segment of a plurality of such segments displayed on the map image and moving the main apparatus to the selected segment.

According to an aspect of another exemplary embodiment, a method of controlling a cleaning robot, includes sensing obstacle information, generating a map based on the sensed obstacle information, analyzing a structure of the map by detecting a region segmentation point and a segment from the map, and generating a map image based on the structure of the map.

Advantageous Effects

According to the cleaning robot and the method of controlling the cleaning robot described above, it is possible to easily recognize a state of the cleaning robot by increasing visibility of the map image and easily give a control command based thereon.

BRIEF DESCRIPTION OF DRAWINGS

FIG. 1 is an external view of a cleaning robot.

FIG. 2a is a bottom view of a main apparatus according to one embodiment, and FIG. 2b is an internal view of the main apparatus according to one embodiment.

FIG. 3 is a block diagram illustrating control components of the cleaning robot.

FIG. 4a is a control block diagram of a communicator according to one embodiment, and FIG. 4b is a control block diagram of a communicator according to another embodiment.

FIG. 5 is view illustrating an example of a home screen of the remote apparatus user interface.

FIG. 6 is view illustrating an example of a menu selection screen of the remote apparatus user interface.

FIG. 7a is a view illustrating an example of a map management screen of the remote apparatus user interface, and FIG. 7b is a view illustrating another example of a map management screen of the remote apparatus user interface.

FIG. 8a is a control block diagram of the main apparatus configured to generate a map image according to one embodiment, and FIG. 8b is a control block diagram of the main apparatus configured to generate a map image according to another embodiment.

FIG. 9 is a control block diagram illustrating the detailed components of the structure analyzer classified according to functions thereof.

FIG. 10 is a flowchart illustrating the method of controlling the cleaning robot that generates a map image according to one embodiment.

FIG. 11 is a flowchart illustrating a method of controlling a cleaning robot that generates a map image according to another embodiment.

FIG. 12 is a concept view illustrating a process in which the main apparatus generates a map image according to one embodiment.

FIG. 13 is a view illustrating an example of the map image generated according to one embodiment.

FIG. 14 is a concept view illustrating a process of detecting a plan view corresponding to a map from plan view data.

FIG. 15 is a plan view including three segments among the plan view data.

FIG. 16 is a view illustrating a map image generated based on a plan view.

FIGS. 19a to 19c are concept views illustrating a process in which a user gives a command for a cleaning operation of the cleaning robot based on a map image displayed by the remote apparatus user interface of the cleaning robot according to one embodiment.

FIGS. 20a to 20c are concept views illustrating a process in which a user gives a command for a cleaning operation of the cleaning robot based on a plan view displayed by the remote apparatus user interface of the cleaning robot according to another embodiment.

FIG. 21 is view illustrating another screen displayed by the remote apparatus user interface of the cleaning robot according to another embodiment.

MODE FOR INVENTION

Figure 17:
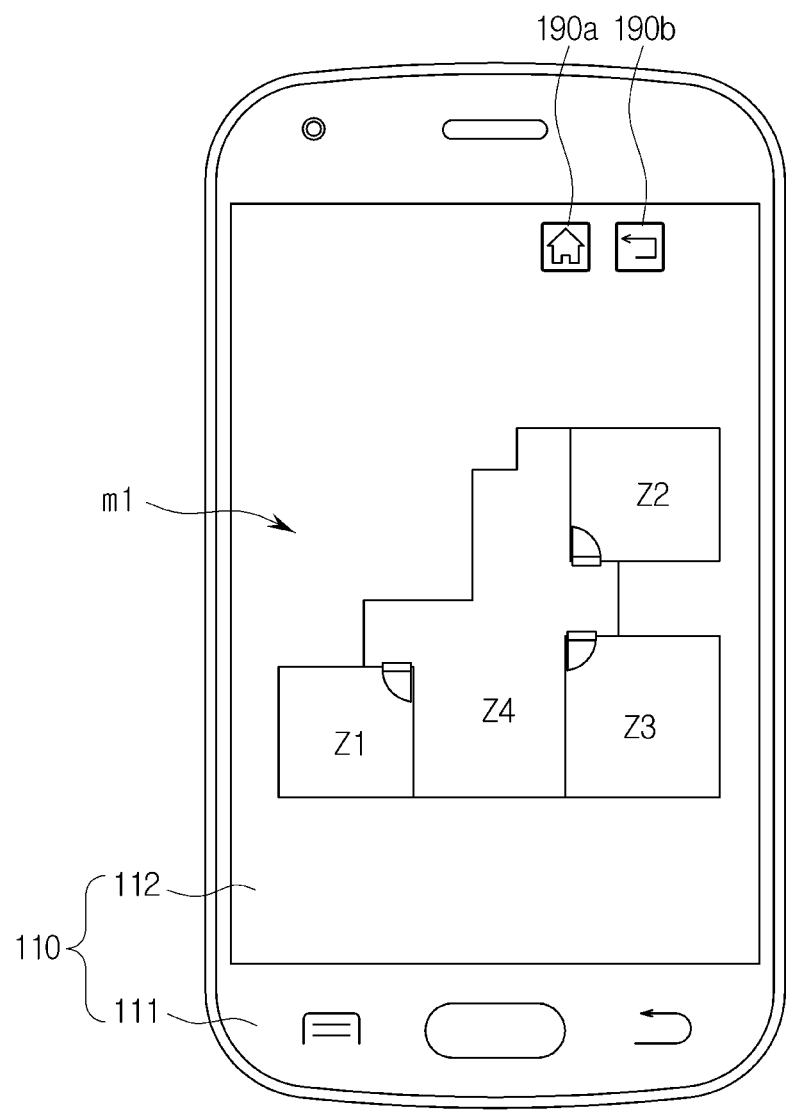
FIG. 17 is a view illustrating an example of a map image displayed by the remote apparatus user interface of the cleaning robot according to one embodiment.

Hereinafter, embodiments of the present invention will be described in detail with reference to the attached drawings to allow those skilled in the art to easily understand and reproduce the present invention. However, in the description of the present invention, certain detailed explanations of well-known functions or components of the related art will be omitted when it is deemed that they may unnecessarily obscure the essence of the present invention The terms used hereafter are selected considering functions in the embodiments and meanings thereof may vary according to intentions of a user and an operator, practices or the like. Accordingly, when the meanings of the terms used in the embodiments described below are defined below in detail, the meanings follow the definitions thereof. When there is no detailed definition, the meanings should be interpreted as meanings generally recognized by one of ordinary skill in the art.

In addition, even though components of selectively disclosed aspects or selectively disclosed embodiments are illustrated as a single integrated component, unless disclosed otherwise, the components should be understood as being freely combined with one another if not obviously technical inconsistency to one of ordinary skill in the art.

Hereinafter, embodiments of a cleaning robot and a method of controlling the cleaning robot will be described with reference to the attached drawings.

Hereinafter, referring to FIG. 1, one embodiment of components of a cleaning robot will be described.

FIG. 1 is an external view of a cleaning robot.

The cleaning robot 1 generates a map including obstacle information of a space of a current position by performing at least one time of cleaning or moving and generates and displays a map image similar to the generated map on a user interface.

In detail, the cleaning robot 1 may recognize the obstacle information of the space of the current position through the at least one time of cleaning or moving using a sensor. Also, the cleaning robot 1 may generate the map including the obstacle information of the space of the current position based on the recognized obstacle information. Also, the cleaning robot 1 may analyze a structure of the map including the obstacle information and may segment the space recognized through the at least one time of cleaning or moving into a plurality of segments based on the analyzed structure. Also, the cleaning robot 1 may substitute the plurality of segments with preset figures to generate a map image obtained by combining a plurality of such preset figures to have different volumes or positions. Also, the cleaning robot 1 may generate a map image that replaces a map based on a plan view corresponding to the analyzed structure in prestored plan view data. Also, the cleaning robot 1 may display the generated map image on the user interface to allow the user to easily recognize a structure of the space in which the cleaning robot 1 is currently positioned and a position of the cleaning robot 1.

Also, the cleaning robot 1 may include a main apparatus 200 configured to perform cleaning while moving over a target space and a remote apparatus 100 configured to control an operation of the main apparatus 200 at a long distance and display a current state and the like of the main apparatus 200. Also, the remote apparatus 100, as shown in FIG. 1, may employ a cellular phone but is not limited thereto and may employ personal digital assistants (PDA), a laptop computer, a digital camera, an MP3 player or the like in addition to the cellular phone.

FIG. 2a is a bottom view of a main apparatus according to one embodiment, and FIG. 2b is an internal view of the main apparatus according to one embodiment. The remote apparatus 100 may include a remote apparatus user interface 110 configured to provide a user interface. The remote apparatus user interface 110 may include a remote apparatus inputter 111 and a remote apparatus display 112. Also, the remote apparatus user interface 110 may receive a user command for controlling the main apparatus 200 or may display various pieces of information of the main apparatus 200.

Also, the remote apparatus inputter 111 may include a hardware device such as various buttons or switches, a pedal, a keyboard, a mouse, a trackball, various levers, a handle, a stick or the like for an input of the user.

Also, the remote apparatus inputter 111 may include a graphical user interface such as a touch pad and the like, that is, a software device for a user input. The touch pad may be realized as a touch screen panel (TSP) to form a mutual layer structure with the remote apparatus display 112.

The remote apparatus display 112 may be provided as a cathode ray tube (CRT), a digital light processing (DLP) panel, a plasma display panel (PDP), a liquid crystal display (LCD) panel, an electroluminescence (EL) panel, an electrophoretic display (EPD) panel, an electrochromic display (ECD) panel, a light emitting diode (LED) panel, an organic LED (OLED) panel or the like but is not limited thereto.

As described above, when being formed of the TSP that forms the mutual layer structure with the touch pad, the remote apparatus display 112 may be used as an inputter in addition to the display. Hereinafter, for convenience of description, it will be described in detailed that the remote apparatus display 112 is formed of a TSP.

The main apparatus 200, as shown in FIGS. 1 to 2b, may include a body 2 including a main body 2-1 and a sub-body 2-2, a driving wheel assembly 30, a main brush unit 20, a main apparatus power supply 250, a dust collector, a main apparatus communicator 220, and a main apparatus user interface 280. As shown in FIG. 1, the main body 2-1 may have an approximate semicircular column shape and the sub-body 2-2 may have a rectangular parallelepiped shape. External shapes of the remote apparatus 100 and the main apparatus 200 shown in FIG. 1 are merely an example of an external shape of the cleaning robot 1 and the cleaning robot 1 may have various shapes.

The main apparatus power supply 250 supplies driving power for driving the main apparatus 200. The main apparatus power supply 250 includes a battery electrically connected to driving apparatuses for driving various components mounted on the body 2 to supply driving power thereto. The battery may be provided as a secondary battery capable of being recharged and may be charged by receiving power from a docking station. Here, the docking station is an apparatus on which the main apparatus 200 is docked when the main apparatus 200 completes a cleaning process or an amount of the battery comes to be lower than a reference and may supply power to the main apparatus 200 that is docked thereon using external or internal power.

The main apparatus power supply 250, as shown in FIGS. 2a and 2b, may be mounted below the body 2 but are not limited thereto.

Although not shown in the drawings, the main apparatus communicator 220 may be provided in the body 2 to allow the body 2 to perform communication with the docking station, a virtual guard, the remote apparatus 100 and the like. The main apparatus communicator 220 may transmit whether cleaning of the main apparatus 200 is finished, a residual amount of the battery provided in the body 2, a position of the body 2 and the like to the docking station and may receive a position of the docking station and a docking signal that induces docking of the main apparatus 200 from the docking station.

Also, the main apparatus communicator 220 may transmit and receive an entrance limitation signal to and from a virtual guard that forms a virtual wall. The virtual guard may form the virtual wall by transmitting the entrance limitation signal to a connection path between a current target region and a particular region while the main apparatus 200 moves, and the main apparatus communicator 220 may receive the entrance limitation signal and block the main apparatus 200 from entering the particular region.

The main apparatus communicator 220 may receive a command input by a user through the remote apparatus 100. For example, the user may input a cleaning start/end command, a target region map generation command, a movement command of the main apparatus 200 and the like through the remote apparatus 100 and the main apparatus communicator 220 may receive a user command from the remote apparatus 100 and may allow the main apparatus 200 to perform an operation corresponding thereto. The main apparatus communicator 220 will be described below in more detail.

A plurality of such driving wheel assemblies 30 may be provided, and as shown in FIGS. 2a and 2b two driving wheel assemblies 30 may be provided to be symmetrical to each other left and right sides from a center of a bottom of the body 2. The driving wheel assembly 30 includes driving wheels 33 and 35 configured to perform movement operations such as forward and backward movements, rotational movement and the like during a cleaning process. The driving wheel assembly 30 may be modulated and detachably mounted at the bottom of the body 2. Accordingly, when a failure occurs at the driving wheels 33 and 35 and the like and repair is required, only the driving wheel assembly 30 may be separated from the bottom of the body 2 to repair without disassembling the whole the body 2. The driving wheel assembly 30 may be mounted on the bottom of the body 2 using a method such as hook-coupling, screw-coupling, insertion-fitting or the like.

A caster 31 may be provided at an edge in front of the center of the bottom of the body 2 to allow the body 2 to maintain a stable posture. The caster 31 may form one assembly like the driving wheel assembly 30.

The main brush unit 20 is mounted at an inlet 23 formed at the bottom of the body 2. The main brush unit 20 includes a main brush 21 and a roller 22. The main brush 21 is provided on an outer surface of the roller 22 and stirs and induces dust stacked on a bottom surface toward the inlet 23 as the roller 22 rotates. Here, the main brush 21 may be formed of various materials having elasticity. Also, the roller 22 may be formed of a rigid body but is not limited thereto.

Although not shown in the drawing, an air blower configured to generate a suction force is provided inside the inlet 23 and may collect and move dust suctioned through the inlet 23 to a dust collector for filtering.

Various sensors may be mounted on the body 2. The various sensors may include at least one of an obstacle sensor 261, a bottom sensor 262, and an image sensor 263.

The obstacle sensor 261 is a sensor for sensing obstacles that exist on a movement path of the main apparatus 200, for example, furnishings, furniture, wall surfaces, wall corners, and the like and may be provided as an ultrasonic sensor capable of recognizing a distance but is not limited thereto.

A plurality of such obstacle sensors 261 are provided on a front and a side of the body 2 to form a perimeter of the body 2, and a sensor window is provided in front of the plurality of obstacle sensors 261 to protect and shield the obstacle sensors 261 from the outside.

The image sensor 263 indicates a sensor configured to recognize a position of the main apparatus 200 and forms a map for movement of the main apparatus 200 or a target region. The image sensor 263 is provided as an apparatus capable of obtaining image data such as a camera and the like and may be provided above the body 2. In other words, the image sensor 263 extracts features from the image data above the main apparatus 200, recognizes the position of the main apparatus 200 using the features not only to generate a map of a target region but also to recognize a current position of the main apparatus 200 on the map. The obstacle sensor 261 and the image sensor 263 that are mountable on the body 2 will be described below in more detail.

A main apparatus user interface 280 may be provided above the body 2. The main apparatus user interface 280 may include a main apparatus inputter 281 for receiving a user command and a main apparatus display 282 configured to display various states of the main apparatus 200 to provide a user interface. For example, a battery charging state, whether the dust collector is filled with dust, a cleaning mode and a dormant mode of the main apparatus 200 or the like may be displayed through the main apparatus display 282. Since embodied shapes of the main apparatus inputter 281 and the main apparatus display 282 are identical to the remote apparatus inputter 111 and the remote apparatus display 112 described above, a detailed description thereof will be omitted.

As described above, an exterior of the cleaning robot according to one embodiment has been described. Hereinafter, referring to FIG. 3, components of the cleaning robot according to one embodiment will be described.

FIG. 3 is a block diagram illustrating control components of the cleaning robot.

The cleaning robot 1 may include the remote apparatus 100 and the main apparatus 200 connected to each other through wired or wireless communication. The remote apparatus 100 may include a remote apparatus communicator 120, a remote apparatus controller 130, a remote apparatus storage 140, and the remote apparatus user interface 110.

The remote apparatus communicator 120 transmits and receives various signals and data to and from the main apparatus 200, an external server or the like through wired or wireless communication. For example, the remote apparatus communicator 120 may download an application for managing the main apparatus 200 from the external server (for example, a web server, a mobile communication server or the like) according to a user command through the remote apparatus user interface 110. Also, the remote apparatus communicator 120 may download plan view data of a target region from the external server. Here, a plan view is a picture that shows a structure of a space in which the main apparatus 200 is positioned and the plan view data is data that includes a plurality of different house plan views.

The remote apparatus communicator 120 may transmit a "map generation" command of a user to the main apparatus 200 and may receive a generated map image from the main apparatus 200. Also, the remote apparatus communicator 120 may transmit a map image edited by the user to the main apparatus 200.

Also, the remote apparatus communicator 120 may transmit a "cleaning start" command, a "cleaning completion" command, or a "designation of a target region" input by the user to the main apparatus 200.

For this, the remote apparatus communicator 120 may include various communication modules such as a wireless internet module, a local area communication module, a mobile communication module, and the like.

The remote apparatus communicator 120 will be described below in detail with reference to FIG. 4a.

The remote apparatus controller 130 controls overall operations of the remote apparatus 100. The remote apparatus controller 130 may control each of components of the remote apparatus 100, that is, the remote apparatus communicator 120, the remote apparatus display 112, the remote apparatus storage 140 and the like based on a user command input through the remote apparatus user interface 110.

The remote apparatus controller 130 may generate a control signal for the remote apparatus communicator 120. For example, when the user inputs the "map generation" command, the remote apparatus controller 130 may generate a control signal for the remote apparatus communicator 120 to transmit a command for generating a map image in which preset figures are combined to the main apparatus 200. Also, when the user inputs a "plan view data download" command, the remote apparatus controller 130 may generate a control signal for the remote apparatus communicator 120 to download plan view data in which a plurality of different house plan views are collected from an external server.

The remote apparatus controller 130 may generate a control signal for the remote apparatus display 112. For example, the remote apparatus controller 130 may generate a control signal for outputting a screen corresponding to a user input. The remote apparatus controller 130 may generate a control signal to perform a screen conversion. Also, the remote apparatus controller 130 may generate a control signal to display a received map image.

The remote apparatus controller 130 may generate a control signal for the remote apparatus storage 140. The remote apparatus controller 130 may generate a control signal to store the received map image.

The remote apparatus controller 130 may be various processors including at least one chip with an integrated circuit thereon. The remote apparatus controller 130 may be provided at one processor but may be provided to be separated in a plurality of processors.

The remote apparatus storage 140 temporarily or nontemporarily stores data and a program for operations of the remote apparatus 100. For example, the remote apparatus storage 140 may store an application for managing the main apparatus 200. Also, the remote apparatus storage 140 may store a map image received from the main apparatus 200 and may store plan view data downloaded from the external server.

The remote apparatus storage 140 described above may include at least one of a flash memory type memory, a hard disk type memory, a multimedia card micro type memory, a card type memory (for example, a secure digital (SD) or extreme digital (XD) memory or the like), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk and the like.

The remote apparatus user interface 110 may receive various commands for controlling the main apparatus 200 from the user. For example, the user may input a "map generation" command that indicates generating a map image in which a plurality of preset figures are combined, a "room/recharging base position designation" command for designating one or more segments displayed on the map image as a room or for designating a position of a docking station, a "plan view generation" command for generating a map image based on a plan view corresponding to a structure of a map, a "plan view data download" command for downloading plan view data in which a plurality of house plan views are combined, a "cleaning management" command for designating a target region in the displayed map image and moving the main apparatus 200 thereto, and the like through the user interface.

The remote apparatus user interface 110 may display various pieces of information of the main apparatus 200. For example, the remote apparatus user interface 110 may display a map image of a target region over which the main apparatus 200 will move to clean. Also, the remote apparatus user interface 110 may display the received map image.

The main apparatus 200 may include the main apparatus power supply 250, a main apparatus sensor 260, the main apparatus communicator 220, a main apparatus controller 230, a main apparatus driver 270, the main apparatus user interface 280, and a main apparatus storage 240.

The main apparatus power supply 250, as described above with reference to FIGS. 2a and 2b, is provided as a battery and supplies driving power for driving the main apparatus 200.

The main apparatus communicator 220 transmits and receives various signals and data to and from the remote apparatus 100 or an external apparatus through wired or wireless communication. For example, the main apparatus communicator 220 may receive a "map generation" command of a user through the remote apparatus 100 and may transmit a generated map to the remote apparatus 100. Also, the main apparatus communicator 220 may receive a map stored in the remote apparatus 100 and a cleaning schedule stored in the remote apparatus 100. Here, the stored map may mean a finally stored map and the stored cleaning schedule may mean a finally stored cleaning schedule. The main apparatus communicator 220 may transmit a current state value and cleaning history data of the main apparatus 200 to the remote apparatus 100.

Also, the main apparatus communicator 220 may receive a cleaning start command or a cleaning completion command of the user from the remote apparatus 100. When a transmission environment is inconsistent while the main apparatus 200 performs cleaning, the main apparatus communicator 220 may transmit a message indicating that the environment is inconsistent to the remote apparatus 100. Likewise, when a region impossible to clean occurs, the main apparatus communicator 220 may transmit a message indicating that cleaning is impossible to the remote apparatus 100.

The main apparatus communicator 220 will be described below in detail with reference to FIG. 4a.

The main apparatus sensor 260 senses an obstacle and a ground state necessary for movement of the main apparatus 200. Also, the main apparatus sensor 260 may include the obstacle sensor 261 and the image sensor 263.

The plurality of obstacle sensors 261 are provided on an outer circumferential surface of the body 2 to sense an obstacle that exists in front of or on the side of the main apparatus 200 and transmit a sensing result to the main apparatus controller 230.

The obstacle sensor 261 may be provided as a contact type sensor or may be provided as a non-contact type sensor depending on whether coming into contact with an obstacle and may be provided as a contact type sensor mixed with a non-contact type sensor. The contact type sensor means a sensor configured to sense an obstacle when the body 2 actually collides with the obstacle, and the non-contact type sensor means a sensor configured to sense an obstacle without a collision between the body 2 and the obstacle or sense the obstacle in advance before the collision with the obstacle.

The non-contact type sensor may include an ultrasonic sensor, an optical sensor, a radio frequency (RF) sensor or the like. When the obstacle sensor 261 is provided as an ultrasonic sensor, an obstacle may be sensed by emitting ultrasonic waves toward a movement path and receiving reflected ultrasonic waves. When the obstacle sensor 261 is provided as an optical sensor, an obstacle may be sensed by emitting light in an infrared region or a visible ray region and receiving reflected light. When the obstacle sensor 261 is provided as an RF sensor, an obstacle may be sensed by transmitting radio waves with a particular frequency, for example, microwaves using a Doppler Effect and detecting a change in frequency of reflected waves.

The image sensor 263 is provided as an apparatus capable of obtaining image data such as a camera or the like and may be mounted above the body 2 and recognize a position of the main apparatus 200. The image sensor 263 extracts features of image data above the main apparatus 200 and recognizes the position of the main apparatus 200 using the features. Position information sensed through the image sensor 263 may be transferred to the main apparatus controller 230.

A sensor value of the main apparatus sensor 260, that is, sensor values of the obstacle sensor 261 and the image sensor 263 may be transmitted to the main apparatus controller 230, and the main apparatus controller 230 may generate a map with respect to a target region based thereon. Since a method of generating a map based on a sensor value is a well-known technology in the art, a description thereof will be omitted. Also, FIG. 4a illustrates an example of the main apparatus sensor 260, as long as it is possible to generate a map of a target region, a different type of sensor may be further included or some sensors may be omitted.

The main apparatus driver 270 may include a driving wheel driver 271 for controlling driving of the driving wheel assembly 30, a main brush driver 272 for controlling driving of the main brush unit 20, and a side brush driver 273.

The driving wheel driver 271 may move the main apparatus 200 by controlling the driving wheels 33 and 35 mounted at the bottom of the body 2 under the control of the main apparatus controller 230. When a "map generation" command or a "cleaning start" command of a user is transferred to the main apparatus 200, the driving wheel driver 271 controls driving of the driving wheels 33 and 35 and accordingly the main apparatus 200 moves over a target region. The driving wheel driver 271 may be included in the driving wheel assembly 30 to be modulated therewith.

The main brush driver 272 drives the roller 22 mounted at the inlet 23 of the body 2 under the control of the main apparatus controller 230. The main brush 21 rotates according to rotation of the roller 22 to perform cleaning of a bottom surface. When a "cleaning start" command of a user is transferred to the main apparatus 200, the main brush driver 272 controls driving of the roller 22.

The main apparatus controller 230 controls overall operations of the main apparatus 200. The main apparatus controller 230 may control each of components of the main apparatus 200, that is, the main apparatus communicator 220, the main apparatus driver 270, the main apparatus storage 240 and the like.

In detail, the main apparatus controller 230 may generate a control signal for the main apparatus driver 270. For example, when a "map generation" command is received, the main apparatus controller 230 may generate a control signal with respect to the driving wheel driver 271 to drive the driving wheels 33 and 35. While the driving wheels 33 and 35 are driven, the main apparatus controller 230 may receive sensor values from the main apparatus sensor 260 and may generate a map image of a target region based thereon. When a "cleaning start" command is received, the main apparatus controller 230 may control the main brush driver 272 to drive the main brush unit 20.

Also, the main apparatus controller 230 may generate a control signal for the main apparatus communicator 220. When a "map generation" command is received, the main apparatus controller 230 may generate a map image of a target region based on sensor values of the main apparatus sensor 260 and may control the main apparatus communicator 220 to transmit a generated map image to the remote apparatus 100.

Also, the main apparatus controller 230 may determine whether an environment is inconsistent during cleaning. When the environment is inconsistent, the main apparatus controller 230 may control the main apparatus communicator 220 to transmit a message indicating that the environment is inconsistent to the remote apparatus 100. A user may check the message indicating that the environment is inconsistent and may determine whether the map image is updated. When a "map update" command is received, the main apparatus controller 230 updates a map image based on a user command. When the environment is inconsistent, the main apparatus controller 230 may automatically update the map image.

Also, to prevent a malfunction caused by the inconsistency of environment, when the environment is inconsistent, the main apparatus controller 230 may control the main apparatus 200 to stop cleaning and return for recharging.

Also, the main apparatus controller 230 may determine whether a region impossible to clean is present during cleaning. When the region impossible to clean is present, the main apparatus controller 230 may control the main apparatus communicator 220 to transmit a message indicating that the region impossible to clean is present. The user may check that the region impossible to clean is present and may determine whether a target region moves. When a "region movement" command is received, the main apparatus controller 230 generates a control signal to move to a next target region based on a user command. When the region impossible to clean is present, the main apparatus controller 230 may automatically generate a control signal to move to the next target region. In this case, the main apparatus controller 230 may control the main apparatus 200 to stop cleaning and return for recharging.

Also, the main apparatus controller 230 may generate a control signal for the main apparatus storage 240. The main apparatus controller 230 may generate a control signal to store a generated map. The main apparatus controller 230 may generate a control signal to store a map and a cleaning schedule transmitted from the remote apparatus 100.

Also, the main apparatus controller 230 may be various processors including at least one chip with an integrated circuit thereon. The main apparatus controller 230 may be provided at one processor but may be provided to be separated in a plurality of processors.

Also, the main apparatus controller 230 may generate a map including obstacle information by receiving sensor values from the main apparatus sensor 260 and may segment the map into a plurality of regions by analyzing a structure of the generated map. Hereinafter, the segmented regions are referred to as "segments".

Also, the main apparatus controller 230 may generate a map image in which a plurality of preset figures are combined by substituting a plurality of such segments with preset different figures. Also, the main apparatus controller 230 may detect a plan view corresponding to the analyzed structure of the map among the plan view data stored in the main apparatus storage 240 and may generate a map image by postprocessing the corresponding plan view. Also, the main apparatus controller 230 may transfer the generated map image to the main apparatus communicator 220 or the main apparatus user interface 280. Generating of a map image will be described below in detail with reference to FIGS. 8a to 18.

The main apparatus user interface 280 may display a current operation state of the main apparatus 200 and a map image of a section in which the main apparatus 200 is currently positioned and may display a current position of the main apparatus 200 on the displayed map image. Also, the main apparatus user interface 280 may receive and transmit an operation command of a user to the controller. The main apparatus user interface 280 may be identical to or different from the main apparatus user interface 280 that has been described with reference to FIGS. 1 to 2*b*.

The main apparatus storage 240 temporarily or nontemporarily stores data and programs for operations of the main apparatus 200. For example, the main apparatus storage 240 may temporarily or nontemporarily store a state value of the main apparatus 200. The main apparatus storage 240 may store cleaning history data, and the cleaning history data may be periodically or aperiodically updated. When the main apparatus controller 230 generates a map image or updates a map image, the main apparatus storage 240 may store the generated map image or the updated map image. Also, the main apparatus storage 240 may store a map image transmitted from the remote apparatus 100.

The main apparatus storage 240 may store a program for generating a map image or updating a map image. The main apparatus storage 240 may store a program for generating or updating cleaning history data. The main apparatus storage 240 may store a program for determining whether an environment is consistent, a program for determining whether a region is impossible to clean, or the like.

The remote apparatus storage 1400 described above may include at least one of a flash memory type memory, a hard disk type memory, a multimedia card micro type memory, a card type memory (for example, an SD or XD memory or the like), an RAM, an SRAM, an ROM, an EEPROM, a PROM, a magnetic memory, a magnetic disk, an optical disk and the like. However, it is not limited thereto and may be embodied as another random type well-known in the art.

FIG. 4*a* is a control block diagram of a communicator according to one embodiment, and FIG. 4*b* is a control block diagram of a communicator according to another embodiment.

Referring to FIG. 4*a*, the communicator may include the remote apparatus communicator 120 included in the remote apparatus 100 and the main apparatus communicator 220 included in the main apparatus 200.

The remote apparatus communicator 120, the main apparatus communicator 220, and a network are connected to one another to send and receive data. For example, the main apparatus communicator 220 may transmit a map image generated by the main apparatus controller 230 and a current position of the main apparatus 200 to the remote apparatus 100 and the remote apparatus communicator 120 may transmit an operation command input by a user to the main apparatus 200. Also, the remote apparatus communicator 120 may be connected to the network, receive an operation state of another home appliance 330, and transfer a control command with respect thereto. Also, the main apparatus communicator 220 may be connected to another remote apparatus 320 to receive a control command. In some embodiments, the network is connected to a router 340.

Also, referring to FIG. 4*b*, the main apparatus communicator 220 may be connected to the network and download plan view data from a server 310.

The remote apparatus communicator 120 may include a remote apparatus local area communication module 121 that is a local area communication module, a remote apparatus wired communication module 122 that is a wired communication module, and a remote apparatus mobile communication module 123 that is a mobile communication module. Also, the main apparatus communicator 220 may include a main apparatus local area communication module 221 that is a local area communication module, a main apparatus wired communication module 222 that is a wired communication module, and a main apparatus mobile communication module 223 that is a mobile communication module.

Here, the local area communication module may be a module for local area communication within a certain distance. A local area communication technology may include wireless local area network (LAN), wireless fidelity (Wi-Fi), Bluetooth, Zigbee, Wi-Fi direct (WFD), ultra wideband (UWB), infrared data association (IrDA), Bluetooth low energy (BLE), near field communication (NFC) and the like but is not limited thereto.

Also, the wired communication module means a module for communication using an electrical signal or an optical signal. A wired communication technology may use a pair cable, a coaxial cable, an optical fiber cable, an Ethernet cable and the like but is not limited thereto.

Also, a mobile communication module may transmit and receive wireless signals to and from at least one of a base station, an external terminal, and the server 310 over a mobile communication network. The wireless signal may include various forms of data according to transmitting and receiving a voice call signal, an image communication call signal, or a text/multimedia message.

Hereinafter, referring to FIGS. 5 to 7*b*, one embodiment of a menu selection screen displayed on the remote apparatus will be described.

FIG. 5 is view illustrating an example of a home screen of the remote apparatus user interface.

At a front surface of the remote apparatus 100, the remote apparatus user interface 110 including the remote apparatus inputter 111 and the remote apparatus display 112 may be provided. The remote apparatus inputter 111 may include a plurality of buttons. Here, the buttons may be hardware buttons or software buttons. The remote apparatus display 112 may be formed of a touch screen panel and sense an input of a user.

The remote apparatus 100 may include an application installed therein to manage the main apparatus 200. Here, the application for managing the main apparatus 200 will be simply referred to as 'a cleaning robot application'. The remote apparatus display 112 may display the installed application on the home screen and provide convenience of user's access to the application. For example, the remote apparatus display 112 may display the installed application as an icon 150 referred to as "cleaning robot".

The user may execute the cleaning robot application by touching the "cleaning robot" icon 150. When the cleaning robot application is executed, the remote apparatus display 112 may perform a screen transition to a screen shown in FIG. 6.

FIG. 6 is view illustrating an example of a menu selection screen of the remote apparatus user interface.

A "home screen" icon 190*a* may be displayed at an upper end of the remote apparatus display 112 to return to the home screen. That is, when the "home screen" icon 190*a* is selected, it is possible to return to the screen shown in FIG. 5. A "map management" icon 160, a "cleaning management" icon 170, and an "start/completion" icon 180 may be sequentially displayed below the "home screen" icon 190*a*. Here, the "map management" icon 160 is an icon provided to manage a map image of a region on which the main apparatus 200 moves or which the main apparatus 200 cleans, that is, a target region. The "cleaning management" icon 170 is an icon provided to designate a particular segment based on the generated map image and to move or allow the main apparatus 200 to clean. Also, the "start/completion" icon 180 is an icon for inputting a user command for cleaning-start or cleaning-completion.

The user may perform a transition of a screen of the remote apparatus display 112 to a screen for map management by selecting the "map management" icon 160.

FIG. 7*a* is a view illustrating an example of a map management screen of the remote apparatus user interface, and FIG. 7*b* is a view illustrating another example of a map management screen of the remote apparatus user interface.

Referring to FIG. 7*a*, the "home screen" icon 190*a* and a "previous screen" icon 190*b* for returning to a previous screen may be displayed at the upper end of the remote apparatus display 112 according to one embodiment. That is, when the "previous screen" icon 190*b* is selected, it is possible to return to a previous screen. Also, a "map generation" icon 161 and a "room/recharging base position designation" icon 164 may be displayed below the "home screen" icon 190*a* and the "previous screen" icon 190*b*. Here, the "map generation" icon 161 is an icon for generating and displaying a map image obtained by analyzing a structure of a map to segment the map into a plurality of segments and schematizing the plurality of segments. Also, the "room/recharging base position" icon 164 is an icon for displaying a screen to allow the user to designate one or more segments displayed on the map image as rooms or to designate a position of a docking station.

The user may select the "map generation" icon 161 to recognize displaying of a map image obtained by segmenting and schematizing a map into a plurality of segments or rooms by the main apparatus 200. Also, the user may designate each of the segments segmented on the map image, for example, as a bedroom1, a bedroom2 and the like and may designate a place at which the docking station is positioned, by selecting the "room/recharging base position" icon 164. Also, it is possible to designate an already designated room as another room or correct the position of the docking station.

Referring to FIG. 7*b*, the "map generation" icon 161, a "plan view generation" icon 162, and a "plan view data download" icon 163 may be sequentially displayed below the "home screen" icon 190*a* and the "previous screen" icon 190*b* of the remote apparatus display 112 according to another embodiment. Here, the "plan view generation" icon 162 is an icon for analyzing a structure of a map, detecting a plan view corresponding to the analyzed structure of the map among plan view data in which a plurality of different plan views are collected, and generating and displaying a map image using the corresponding plan view. Also, the "plan view data download" icon 163 is an icon for being connected to the network and downloading data with respect to a plan view of a house from the external server.

The user may select the "plan view generation" icon 162 to allow the main apparatus 200 to analyze a structure of a map, detect a plan view corresponding to the analyzed structure, and recognize displaying of a map image. Also, the user may select the "plan view data download" icon 163 to download data with respect to a plan view of a house.

The "map generation" icon 161 may be omitted, and in this case, a map may be generated by selecting the "plan view generation" icon 162.

Hereinafter, referring to FIGS. 8*a* and 8*b*, various embodiments of components of the main apparatus controller will be described.

FIG. 8*a* is a control block diagram of the main apparatus configured to generate a map image according to one embodiment, and FIG. 8*b* is a control block diagram of the main apparatus configured to generate a map image according to another embodiment.

Referring to FIG. 8*a*, the main apparatus 200 may generate a map including obstacle information by cleaning or moving over a space of a current position at least one time and may analyze a structure of the map based on the generated map. Also, the main apparatus 200 may segment the map into a plurality of regions based on the analyzed structure of the map and may generate a map image by schematizing a plurality of segments.

In detail, the main apparatus 200 may include a main apparatus sensor 260, the main apparatus storage 240, the main apparatus controller 230, the main apparatus communicator 220, and the main apparatus user interface 280.

The main apparatus sensor 260 may sense obstacle information of a space obtained through cleaning or moving over the space in which the main apparatus 200 is positioned and may transfer whether an obstacle is present in the corresponding space to the main apparatus controller 230.

Also, the main apparatus sensor 260 may be identical to or different from the main apparatus sensor 260 that has been described with reference to FIGS. 2*a* to 3.

The main apparatus storage 240 stores data for generating a map image.

In detail, the main apparatus storage 240 may store a program for generating a map image or store a map including previously obtained obstacle information.

Also, the main apparatus storage 240 may store a map image generated according to a "map generation" command of the user.

Also, the main apparatus storage 240 may be identical to or different from the main apparatus storage 240 that has been described with reference to FIG. 3.

The main apparatus controller 230 may receive obstacle information of a space in which the main apparatus 200 is positioned from the main apparatus sensor 260, generate a map of the corresponding space, and analyze a structure of the generated map. Also, the main apparatus controller 230 may segment the map into a plurality of regions based on the analyzed structure of the map, substitute each of segmented regions with a figure or a plan view corresponding to the structure of the map, and generate a schematized map image.

Also, the main apparatus controller 230 may include a map generator 231, a structure analyzer 232, a region segmenter 233, and a postprocessor 234.

The map generator 231 collects obstacle information transmitted from the main apparatus sensor 260 and generates a map including obstacle information of a place at which the main apparatus 200 is currently positioned.

In detail, the map generator 231 may show the map whether an obstacle is present at a place to which the main apparatus 200 moves from an initial start place based on a movement direction and a movement distance of the main apparatus 200 from the place the main apparatus 200 is currently positioned. The main apparatus 200 may perform this until all partition walls at which an obstacle of an outermost portion of the map is present are connected. Also, the map generated by the map generator 231 may be binary-coded data that displays whether an obstacle is present or not, at a corresponding place. For example, the map generator 231 may display a pixel at a place at which an obstacle is present as 1 and may display a pixel at a place without an obstacle as 0.

The structure analyzer 232 analyzes a structure of a map generated by the map generator 231 and structurally analyzes segments of a space in which the main apparatus 200 is positioned and arrangements of the segments. The structure analyzer 232 will be described below in detail with reference to FIG. 9.

The region segmenter 233 segments the map into a plurality of regions based on the structure of the map analyzed by the structure analyzer 232 (that is, determines a plurality of segments). The region segmenter 233 will also be described below in detail with reference to FIG. 9.

The postprocessor 234 substitutes the binary-coded map generated for an operation of the main apparatus 200 with an image capable of being easily understood and recognized by a user based on the structure of the map analyzed by the structure analyzer 232 and information of the segments from the region segmenter 233.

In detail, the postprocessor 234 may substitute a plurality of such segments with figures corresponding sizes and shapes of the segments of the region segmenter 233 and generate a map image to display an image including the plurality of segments as an image in which a plurality of figures are combined. Here, the figures may include figures having various sizes to correspond to the segments, may include figures having shapes of a rectangle, a square, a trapezoid, a chamfered quadrangle, an oval, a circle, a polygon and the like, and may include a free figure formed of a straight line or a curved line.

Also, the postprocessor 234 may transfer the generated map image to the main apparatus communicator 220 to transfer the generated map image to the remote apparatus 100 to display it on the remote apparatus user interface 110 and may transfer the generated map image to the main apparatus user interface 280 to display the map image on the main apparatus user interface 280.

Also, the main apparatus controller 230 functions as a central processing unit, the central processing unit may be a micro processor, and the micro processor is a processor in which an arithmetic logic unit, a register, a program counter, a command decoder, a control circuit and the like are provided on at least one silicon chip.

Also, the micro processor may include a graphic processing unit (GPU) for graphic processing of an image or a video. The micro processor may be provided as a system on chip (SoC) including a core and the GPU. The micro processor may include a single core, a dual core, a triple core, a quad core, and a multiple core thereof.

Also, the main apparatus controller 230 may include a graphic processing board including a GPU, an RAM, or an ROM on a separate circuit board electrically connected to a micro processor.

Referring to FIG. 8b, according to another embodiment, the main apparatus 200 may detect a plan view corresponding to an analyzed structure of a map among plan view data and may generate a map image based on the corresponding plan view.

For this, the main apparatus storage 240 provides a plan view corresponding to a structure of a map analyzed when generating a map image. That is, the main apparatus storage 240 may store plan view data including a plurality of house plan views.

The main apparatus controller 230 may generate the map image by segmenting the map into a plurality of regions based on the analyzed structure of the map and substituting it with the plan view.

In this case, the main apparatus controller 230 may also include the map generator 231, the structure analyzer 232, the region segmenter 233, and the postprocessor 234. The map generator 231, the structure analyzer 232, and the region segmenter 233 will be described below in detail with reference to FIG. 9.

The postprocessor 234 may detect a plan view corresponding to the analyzed structure of the map from plan view data including a plurality of different house plan views based on the structure of the map analyzed by the structure analyzer 232 and information on the segments generated by the region segmenter 233. Also, the postprocessor 234 may generate the map image by postprocessing the plan view in a forward direction, rotated directions at 90, 180, and 270 degrees, or an upside down direction of the plan view based on the detected plan view. For example, the postprocessor 234 may generate a map image obtained by removing a space incapable of being accessed by the main apparatus such as a balcony or a foyer from the plan view.

Also, the postprocessor 234 may match the generated map image with the map. In detail, the postprocessor 234 may generate a converted coordinate to allow a position at a particular place of the generated map to correspond to one place at the map. Also, the postprocessor 234 may generate a converted coordinate that converts the particular place at the map image into one place at the map when the map image corresponds to the map rotated at 90, 180, or 270 degrees or corresponds to the vertically symmetrical map.

Also, when there is no place corresponding to the map among particular places of the map image, the postprocessor 234 may match a place most adjacent to the particular place among places corresponding to the map with the corresponding place of the map.

Also, the postprocessor 234 may transfer the generated map image to the main apparatus communicator 220 to transfer the generated map image to the remote apparatus 100 to display it on the remote apparatus user interface 110 and may transfer the generated map image to the main apparatus user interface 280 to display the map image on the main apparatus user interface 280.

Hereinafter, referring to FIG. 9, detailed components and functions of the structure analyzer 232 and the region segmenter 233 will be described.

FIG. 9 is a control block diagram illustrating the detailed components of the structure analyzer classified according to functions thereof.

Referring to FIG. 9, the structure analyzer 232 may include a map processor 232-1, a frame generator 232-2, an edge processor 232-3, and a region segmentation point detector 232-4.

The map generated by the map generator 231 is obtained by recording obstacle information with respect to a corresponding space while the main apparatus 200 moves and has an irregular form. Accordingly, the map processor 232-1 trims an external shape of the map uniform using an image processing method to trim the external shape of the map uniform.

For example, the map processor 232-1 may remove a groove or a protrusion on the outside of the map using morphology. Here, the morphology is an image processing method of modifying a shape of a particular object present in an image by accessing the image in view of morphology. The morphology is generally used for a purpose of removing noise in processing a binary image or describing a shape of an object in the image and uses an inclusion relationship, movement, symmetry, a complementary set, a difference set and the like of a set.

The frame generator 232-2 uniformizes the form of the map generated by the map generator 231 and then extracts and connects centers of a plurality of spaces not having obstacles to generate a frame of the map. A method of processing an image that forms a frame may use, for example, a skeletonizing method.

The edge processor 232-3 removes an unnecessary edge from one or more branches, that is, edges included in the formed frame. For example, the edge processor 232-3 detects a place that becomes a branch point of the edges at the frame as a node, determines an unnecessary edge according to an angle and a length of the edge connected to each node, and removes the unnecessary edge. It will be described below in detail with reference to FIG. 12.

Here, the edge processor 232-3 may classify the nodes into a branch node that is a center of the frame and a leaf node that is a node in addition to the branch node. There are present a plurality of such branch nodes.

The region segmentation point detector 232-4 analyzes a separate space of a target space in the map and designates a space to be segmented by the region segmenter 233.

In detail, the region segmentation point detector 233-4 may move a detection point at the edge in a direction from the branch node to any one of a plurality of such leaf nodes, may detect pixels displayed as being without peripheral obstacles (for example, pixels displayed as 0), and may determine that a region segmentation point is present at the corresponding detection point when the detection point passes through a narrow section. Here, the region segmentation point may be a position of a door or a position of an obstacle such as furniture in a real life.

A method of determining passing through a narrow section and detecting a region segmentation point will be described below in detail.

When a region segmentation point is detected, the region segmentation point detector 233-4 may determine pixels present in a direction from the region segmentation point to any one leaf node to be any one segment.

However, when the region segmentation point detector 233-4 may not detect a narrow section while moving a detection point in a direction from a branch node to a leaf node, the region segmentation point detector 233-4 may determine a segment in which the branch node is present and a segment in which the leaf node is present to be identical segments.

Meanwhile, a plurality of such leaf nodes may be present and accordingly a plurality of such region segmentation points may be detected. In this case, the region segmentation point detector 233-4 segments the segments to correspond to the number of region segmentation points.

The region segmenter 233 may designate each segment classified by the structure analyzer 232 as one room and may designate a plurality of such rooms at one map by performing this on the entire map. Through this, the postprocessor 234 substitutes one room with a preset figure. Also, a combination of figures corresponding to the plurality of rooms may be displayed as an image by the postprocessor 234.

Hereinafter, referring to FIGS. 10 and 11, a method of controlling the cleaning robot 1 that generates a map image will be described. FIG. 10 is a flowchart illustrating the method of controlling the cleaning robot that generates a map image according to one embodiment. FIG. 10 may illustrate the method performed when a user selects the "map generation" icon 161 of FIG. 7*a*.

Since components of the cleaning robot 1 described with reference to FIG. 10 are identical to the components that have been described with reference to FIGS. 1 to 9, like reference numerals refer to like components.

Referring to FIG. 10, the map generator 231 of the main apparatus 200 according to one embodiment senses obstacle information by cleaning or moving over a space of a current position and generates a map by combining pieces of the obstacle information (S1110).

Also, the main apparatus controller 230 generates an entire frame of the map by trimming a shape of the generated map or analyzing a structure thereof (S1120). In this case, the main apparatus controller 230 forms the frame of the map by trimming an external shape of the map uniform and extracting and connecting centers of a plurality of spaces not having obstacles.

Also, the main apparatus controller 230 removes an unnecessary edge from one or more edges included in the formed frame and detects a place that is a branch point of each of the edges as a node (S1130). In this case, the main apparatus controller 230 may segment the detected nodes into a branch node that is a center of the frame and a leaf node that is a node in addition to the branch node.

Subsequently, the main apparatus controller 230 detects a region segmentation point from the map (S1140). In this case, the main apparatus controller 230 may move a detection point at the edge in a direction from the branch node to the leaf node, may detect pixels displayed as being without obstacles (for example, pixels displayed as 0), and may determine that a region segmentation point is present at the corresponding detection point when the detection point passes through a narrow section.

Subsequently, the main apparatus controller 230 forms a segment based on the detected region segmentation point (S1150). In this case, the main apparatus controller 230 forms one or more pixels present in a direction from the detected region segmentation point to the leaf node as one segment. However, when the region segmentation point is not detected while the detection point is moved toward the direction from the branch node to the leaf node, the main apparatus controller 230 may form a segment with the branch node and a segment with the leaf node as one same segment. Due to the configuration of the segment described above, the map may be formed of a combination of one or more segments.

Subsequently, the main apparatus controller 230 performs outline processing on pixels forming each segment, substitutes each segment with a figure, and sets a previously detected region segmentation point in each segment (S1160). Here, the main apparatus controller 230 may set the segment including the branch node as a region having features of a living room.

The main apparatus controller 230 may substitute each segment (for example, a room 1) with a square, and the segment including the square may include all pixels forming the room 1.

Also, the main apparatus controller 230 may substitute the region having the features of the living room including the branch node with a free figure corresponding to an outline of the corresponding region, and the free figure corresponding to the outline may include all pixels forming the corresponding segment.

Also, the main apparatus controller 230 may determine whether a direction of the region segmentation point is lateral or longitudinal based on an angle of the detected region segmentation point and accordingly may set an entrance and exit path between segments on the map. The angle of the region segmentation point will be described with reference to FIG. 12.

Also, the main apparatus controller 230 generates a map image by postprocessing the map including the one or more segments substituted with figures and the region segmentation point to be an image adequate for displaying the operation of the main apparatus 200 and transfers the map image to the user interface to allow the user interface to display the map image (S1170).

Meanwhile, operation 1120 of forming the frame to operation S1170 of displaying on the user interface after operation S1110 of generating the map may be performed by the remote apparatus 100. As described above, according to another embodiment, the main apparatus 200 may intuitively display the map image to a user by generating the map image displayed as figures. Meanwhile, the map image according to another embodiment may be substituted with a corresponding plan view and displayed to the user. FIG. 11 is a flowchart illustrating a method of controlling a cleaning robot that generates a map image according to another embodiment. FIG. 11 may illustrate the control method performed when a user selects the "map generation" icon 161 or the "plan view generation" icon 162 of FIG. 7b.

According to another embodiment, the main apparatus 200 also senses obstacle information by performing cleaning or moving over a space and generates a map by combining pieces of the obstacle information (S1210), forms a frame of the map (S1220), removes an unnecessary edge from one or more edges included in the formed frame and detects a place that is a branch point of each edge as a node (S1230), detects a region segmentation point from the map (S1240), forms a segment based on the detected region segmentation point (S1250), and performs outline processing on pixels that form each segment, substitutes each segment with a figure, and sets an entrance and exit path of the main apparatus 200 based on the region segmentation point previously detected from each segment (S1260).

Since operations S1210 to S1260 described above are identical to operations S1110 to S1160, a repeated description will be omitted.

Meanwhile, according to another embodiment, the main apparatus controller 230 compares the map set with one or more segments with plan view data including a plurality of house plan views (S1270) and detects a plan view corresponding to the map.

As an example, the main apparatus controller 230 may determine whether plan view data is stored in the main apparatus storage 240, may output a message indicating that the plan view data is not stored to a user through the user interface 280 when the plan view data is not stored, and may download the plan view data from the external server 310 (refer to FIG. 4b) when the user selects the "plan view data download" icon 163. Also, the downloaded plan view data may be compared with the map.

As another example, the main apparatus controller 230 may determine whether plan view data is stored in the main apparatus storage 240 and may automatically download the plan view data from the external server 310 (refer to FIG. 4b) when the plan view data is not stored. Also, the downloaded plan view data may be compared with the map.

Also, the main apparatus controller 230 generates a map image by postprocessing the plan view to be an image adequate for displaying the operation of the main apparatus 200 based on the plan view corresponding to the map (S1280) and transfers the map image to the user interface to allow the user interface to display the map image (S1290).

As described above, according to another embodiment, the main apparatus 200 may generate the map image shown as a plan view by comparing prestored plan view data with the map and may exquisitely display the map image to the user.

FIG. 12 is a concept view illustrating a process in which the main apparatus generates a map image according to one embodiment, and FIG. 13 is a view illustrating an example of the map image generated according to one embodiment.

The main apparatus controller 230 generates a map GM that displays obstacle information for coordinates of each pixel based on obstacle information sensed by the main apparatus sensor 260 and a movement of the main apparatus 200 sensed by a geomagnetic sensor. In this case, the map may be shown as binary-coded data that displays a corresponding pixel only whether an obstacle is present or not. Also, the main apparatus controller 230 may trim an external shape of the map uniform using an image processing method.

Subsequently, the main apparatus controller 230 extracts and connects centers of a plurality of pixels not having obstacles to generate a frame SM1 of the map. The frame of the map includes one or more edges E1, E2, and E3 and one or more nodes N1, N2, N3, and N4.

Subsequently, the main apparatus controller 230 removes unnecessary edges E2 and E3 from the one or more edges E1, E2, and E3 included in the generated frame (SM2). In this case, the main apparatus controller 230 detects places that become branch points of the edges E1, E2, and E3 from the frame as the nodes N1, N2, N3, and N4, determines the unnecessary edges E2 and E3 according to angles and lengths of the edges E1, E2, E3, E5, and E6 connected to the nodes N1, N2, N3, N4, N5, and N6, and removes the unnecessary edges E2 and E3. For example, the main apparatus controller 230 may determine an edge having a length less than a preset reference length and an angle with another edge less than a preset reference angle to be an unnecessary edge.

Also, the main apparatus controller 230 may classify the nodes N1, N2, N3, N4, N5, and N6 into a branch node N1 that is a center of the frame and leaf nodes N2, N3, N4, N5, and N6 in addition to the branch node N1.

Subsequently, the main apparatus controller 230 moves a detection point at the edge in a direction from the branch node N1 to the leaf nodes N2, N3, N4, N5, and N6 and determines whether pixels around the detection point pass through a narrow section and move to a broad section.

In detail, the main apparatus controller 230 moves the detection point along the edge in the direction from the branch node N1 to the leaf nodes N2, N3, N4, N5, and N6, checks a pixel region (for example, widths of pixels) at each detection point, and determines that the detection point passes through the narrow section when the widths of the pixels satisfy a preset size (for example, from 90 cm to about a first reference value or less than 90 cm) (Di1 to Di3). Also, while the detection point is continuously moved along the edge, it is determined that the detection point passes through the broad section when the widths of the pixels are the preset size or more (Di4 to Di6).

Also, when the detection point moves from the narrow section to the broad section, the main apparatus controller 230 may detect the detection point at the narrow section as region segmentation points D1, D2, and D3. However, when the detection point moves from any one narrow section to another narrow section (that is, not moves to the broad section any more), the detection point corresponding to the any one narrow section is not detected as the region segmentation point.

In this case, in measuring the widths of the pixels, the main apparatus controller 230 i) may measure widths in a horizontal direction and a vertical direction (Di1 to Di4) based on a movement direction at each detection point and ii) may measure widths in random directions at various angles in addition to the horizontal direction and the vertical direction to measure micro widths. Subsequently, the main apparatus controller 230 classifies pixels present in a direction from the each of detected region segmentation points to the leaf nodes as each segment and may classifies other pixels as another segment. That is, the pixels present in a direction from the region segmentation point D1 to the leaf node N3 are classified as a region R1, pixels present in a direction from the region segmentation point D2 to the leaf node N2 are classified as a region R2, and pixels present in a direction from the region segmentation point D3 to the leaf node N4 are classified as a region R3, thereby forming each segment. Here, the main apparatus controller 230 may set a region R4 including the branch node N1 as another segment.

In this case, the main apparatus controller 230 measures a size of each segment, cancels classifying as any one segment when a segment having a size less than a second reference value, and deletes a region segmentation point.

As a method of measuring a size of each segment, the main apparatus controller 230 may measure at least one of a grid number of the map, an entire length of an outline of a segment, a radius of a segment, the area of the smallest square including a segment, and a length of a side of the smallest square including the segment.

Referring to FIG. 12, it will be described that the regions R1 to R4 have sizes of the second reference value or more and classified as segments.

Meanwhile, in the embodiments, it has been described that i) a region segmentation point is detected based on pixel information included in a map and a segment is distinguished based on the region segmentation point. However, the main apparatus controller 230 may ii) sense a region segmentation point such as a door based on a photographed image of the obstacle sensor 261 or image sensor 263 provided as a camera module, iii) sense an identification tag attached to the region segmentation point through a wireless communication module such as a near field communication (NFC) device, a radio frequency identification (RFID) device and the like, or distinguish segments based on the region segmentation point sensed using a method formed by combining two or more of i), ii), and iii).

Subsequently, the main apparatus controller 230 performs outline processing on pixels that form each of the regions R1, R2, R3, and R4, substitutes each region with a figure, and displays the region segmentation points D1, D2, and D3 (DM) previously detected from each of the regions R1, R2, R3, and R4. In this case, each of the regions R1, R2, R3, and R4 may be substituted with a figure proportional to a size of each of the regions R1, R2, R3, and R4 or may be substituted with a figure having the same size regardless of sizes of the regions R1, R2, R3, and R4.

Subsequently, the main apparatus controller 230 generates a map image FM by combining the figures. In this case, a map image that has been postprocessed is illustrated as a combination of segments shown as rectangles and segments shown as free figures but is not limited thereto and may be formed of a combination of segments shown as a chamfered square, a circle, or free figures and is not limited to the shown example in FIG. 12.

For example, referring to FIG. 13, the map image FM generated by the main apparatus controller 230 may have an arrangement in which one segment is positioned at a lower end of a left side, one segment is positioned at an upper end of a right side, and one segment is positioned at a lower end of the right side based on a segment in the center.

In this case, based on the central segment, the main apparatus controller 230 may designate the segment at the lower end of the left side as a first zone Z1, a segment at an upper end of the right side as a second zone Z2, the segment at the lower end of the right side as a third zone Z3, and the segment in the center as a fourth zone Z4.

The map image FM generated as described may be displayed to the user through the remote apparatus display 112. Also, the main apparatus controller 230 matches each position in the map image FM with a position in the map to execute a cleaning command of the user. Meanwhile, according to another embodiment, the main apparatus controller 230 may generate a map image shown as a plan view by additionally matching the map image FM with combined figures with plan view data.

FIG. 14 is a concept view illustrating a process of detecting a plan view corresponding to a map from plan view data, FIG. 15 is a plan view including three segments among the plan view data, and FIG. 16 is a view illustrating a map image generated based on a plan view.

As shown in FIG. 14, the main apparatus controller 230 detects a plan view corresponding to an analyzed structure of the map, the segments of the map, and the map image FM in which preset figures are combined.

In detail, the main apparatus controller 230 detects the plan view having the arrangement corresponding to the first zone Z1 at the lower end of the left side, the second zone Z2 at the upper end of the right side, the third zone Z3 at the lower end of the right side, and the fourth zone Z4 in the center based on a segment close to features of a living room positioned in the center from the plan view data.

For example, it is assumed that the plan view data includes a first plan view PFD1 in which a living room is positioned on a left side and three rooms are positioned on a right side, a second plan view PFD2 in which a living room is positioned in the center, one room is positioned at a lower end of a left side, and two rooms are positioned at an upper end and a lower end of a right side, and a third plan view PFD3 in which a living room is positioned in the center, two rooms are positioned on a left side, and two rooms are positioned on a right side. The main apparatus controller 230 may determine that the first plan view PFD1 includes three rooms but the arrangement of the rooms thereof does not correspond to the map, the third plan view PFD3 does not correspond to the map because there are four rooms, and the number and arrangement of rooms of the second plan view PFD2 correspond to the map. Accordingly, the main apparatus controller 230 may determine the plan view corresponding to the map among the plan view data to be the second plan view PFD2.

It may be known that the second plan view PFD2 corresponding to the map has three rooms and one living room and includes an arrangement in which the living room is positioned in the center, a bedroom1 is positioned at a lower end of a left side, a bedroom2 is positioned at a lower end of a right side, and a bedroom3 is positioned at an upper end of the right side as shown in FIG. 15.

After that, the main apparatus controller 230 determines the plan view corresponding to the map among the plan view data to be the second plan view PFD2 and generates a map image FPF that allows the user to easily recognize a space of a house based on the second plan view PFD2.

Referring to FIG. 16, the main apparatus controller 230 may generate the map image FPF based on the plan view by removing two bathrooms, one foyer, and two balconies incapable of being cleaned by the main apparatus 200 from the second plan view to substitute the map in a forward direction.

The map image FPF generated as described may be displayed to the user through the remote apparatus display 112. Also, the main apparatus controller 230 matches each position in the map image FPF with a position in the map to execute a cleaning command of the user.

Hereinafter, referring to FIGS. 17 to 21, embodiments of displaying a generated map image will be described.

Figure 18:
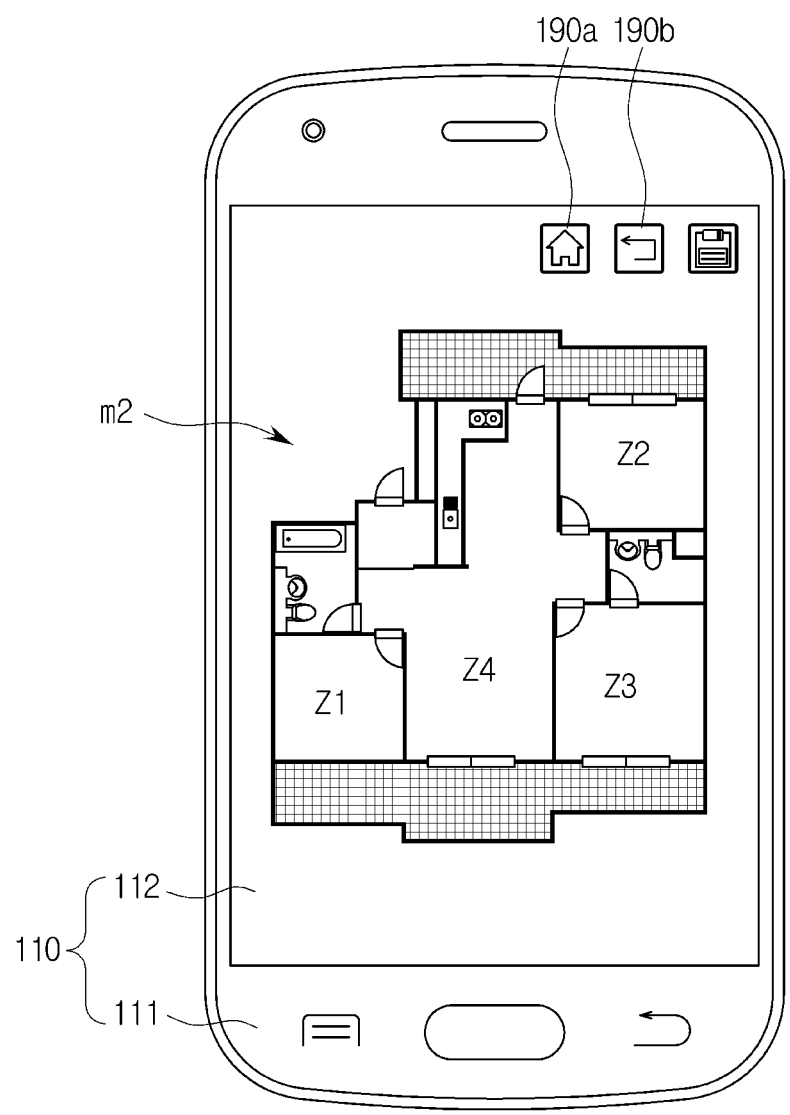
FIG. 18 is a view illustrating an example of a map image displayed by the remote apparatus user interface of the cleaning robot according to another embodiment.

FIG. 17 is a view illustrating an example of a map image displayed by the remote apparatus user interface of the cleaning robot according to one embodiment, and FIG. 18 is a view illustrating an example of a map image displayed by the remote apparatus user interface of the cleaning robot according to another embodiment.

The map image generated by the main apparatus controller 230 according to one embodiment is transferred to the remote apparatus 100 through the main apparatus communicator 220, and the remote apparatus communicator 120 and the transferred map image is displayed on the remote apparatus user interface 110.

In detail, when the main apparatus controller 230 generates a map image that shows one living room and three rooms by combining four of a plurality of preset figures, the map image may be generated to locate the fourth zone Z4 that is a living room at a center, a room of the first zone Z1 on a left side, and the second zone Z2 and the third zone Z3 at a right side based on the fourth zone Z4 as shown in FIG. 17. Also, a map image m1 in which rectangles corresponding to sizes of segments are positioned in the first to third zones Z1 to Z3 may be generated and the generated map image m1 may be displayed on the remote apparatus user interface 110.

Also, according to another embodiment, the main apparatus controller 230 may detect a plan view m2 corresponding to a map image as shown in FIG. 18 and may allow the detected plan view m2 to be displayed on the remote apparatus user interface 110.

Hereinafter, referring to FIGS. 19*a* to 19*c*, a process of inputting a command into the cleaning robot based on a map image will be described.

The cleaning robot 1 may display a generated map image on the user interface. However, in addition, a place at which the main apparatus 200 is currently positioned may be displayed on the displayed map image and a user may designate a desirable segment and may allow the main apparatus 200 to move to or clean the designated segment.

FIGS. 19*a* to 19*c* are concept views illustrating a process in which a user gives a command for a cleaning operation of the cleaning robot based on a map image displayed by the remote apparatus user interface of the cleaning robot according to one embodiment. The cleaning operation of the cleaning robot 1 and a screen shown in FIGS. 19*a* to 19*c* may be performed and displayed when the user selects the "cleaning management" icon 170 shown in FIG. 6 or may be automatically performed and displayed after the map image is generated according to one embodiment.

As shown in FIG. 19*a*, the remote apparatus user interface 110 may display that the main apparatus 200 is currently positioned at a center of a lower end of the fourth zone Z4 that is a living room in the map image generated by combining preset figures (171*a*).

Also, as shown in FIG. 19*b*, a user U may specify and designate the second zone Z2 that the user would like to clean or toward which the user would like to move the main apparatus 200 using a finger. When the user U designates the second zone Z2, the remote apparatus user interface 110 may display the second zone Z2 that is a designated zone 410 in a different color to be distinguished from another segment (171*b*).

Even though it is shown in FIG. 19*b* that only one zone Z2 is specified using a finger, the user U may specify and designate a plurality of segments and a cleaning order of the plurality of segments. In this case, the main apparatus 200 may perform cleaning while moving over the segments according to the designated cleaning order.

Also, the remote apparatus user interface 110 may display a performance degree of cleaning (for example, a completion degree of cleaning) as images such as colors, figures, numbers and the like. For example, the remote apparatus user interface 110 may display a path along which the main apparatus 200 has already moved and may display a segment that has been already cleaned in a different color or text from that of a segment that is not yet cleaned.

Also, as shown in FIG. 19*c*, after the user sets the second zone Z2 as the designated zone 410 and the second zone Z2 is displayed in a different color from that of another segment, the remote apparatus controller 130 or the main apparatus controller 230 sets a movement path from a current position of the main apparatus 200 to the designated zone 410 and displays it on the remote apparatus user interface 110.

For example, the remote apparatus controller 130 or the main apparatus controller 230 may set a path to allow the main apparatus 200 to move to an upper portion and move to a right side over the fourth zone Z4 to move from a place at which the main apparatus 200 is currently positioned to the designated zone 410. Subsequently, the remote apparatus user interface 110 may display a position of the main apparatus 200 in real time (171*c*).

When the main apparatus 200 moves along the movement path in real time, a path along which the main apparatus 200 has already passed may also be removed. When the main apparatus 200 completes the movement, a path along which the main apparatus 200 has already passed may be removed.

Also, when the user U specifies and designates a plurality of segments and a cleaning order of the plurality of segments, the remote apparatus controller 130 or the main apparatus controller 230 may set a movement path according to the designated cleaning order and the remote apparatus user interface 110 may display the set movement path.

Also, when the user U specifies and designates only a plurality of segments, the remote apparatus controller 130 or the main apparatus controller 230 may automatically set a movement path and the remote apparatus user interface 110 may display the set movement path. For example, the remote apparatus controller 130 or the main apparatus controller 230 may set priorities of the segments in order of segments adjacent to the main apparatus 200 and may set a movement path according to the priorities.

FIGS. 20*a* to 20*c* are concept views illustrating a process in which a user gives a command for a cleaning operation of the cleaning robot based on a plan view displayed by the remote apparatus user interface of the cleaning robot according to another embodiment. The cleaning operation of the cleaning robot 1 and a screen shown in FIGS. 20*a* to 20*c* may be performed and displayed when the user selects the "cleaning management" icon 170 shown in FIG. 6 or may be automatically performed and displayed after a plan view corresponding to a map image is detected according to another embodiment.

As shown in FIG. 20*a*, the remote apparatus user interface 110 may display that the main apparatus 200 is currently positioned at a lower end of the fourth zone Z4 that is a living room in a plan view corresponding to a structure of a map (or a postprocessed plan view) (172a).

Also, as shown in FIG. 20b, the user U may specify and designate the second zone Z2 that the user would like to clean or toward which the user would like to move the main apparatus 200 using a finger. When the user U designates the second zone Z2, the remote apparatus user interface 110 may display the second zone Z2 that is the designated zone 410 in a different color to be distinguished from another segment (172b).

Even though it is shown in FIG. 20b that only one zone Z2 is specified using a finger, the user U may specify and designate a plurality of segments and a cleaning order of the plurality of segments. In this case, the main apparatus 200 may perform cleaning while moving over the segments according to the designated cleaning order.

Also, the remote apparatus user interface 110 may display a performance degree of cleaning (for example, a completion degree of cleaning) as images such as colors, figures, numbers and the like. For example, the remote apparatus user interface 110 may display a path along which the main apparatus 200 has already moved and may display a segment that has already been cleaned in a different color or text from that of a segment that is not yet cleaned.

Also, as shown in FIG. 20c, after the user sets the second zone Z2 as the designated zone 410 and the second zone Z2 is displayed in a different color from that of another segment, the remote apparatus controller 130 or the main apparatus controller 230 sets a movement path from a current position of the main apparatus 200 to the designated zone 410 and displays it on the remote apparatus user interface 110.

For example, the remote apparatus controller 130 or the main apparatus controller 230 may set a path to allow the main apparatus 200 to move to a left side, move to an upper portion and then move to the left side and move to the upper portion over the fourth zone Z4 to move from a place at which the main apparatus 200 is currently positioned to the designated zone 410. Subsequently, the remote apparatus user interface 110 may display a position of the main apparatus 200 in real time (172c).

When the main apparatus 200 moves along the movement path in real time, a path along which the main apparatus 200 has already passed may also be removed in real time. When the main apparatus 200 completes the movement, a path along which the main apparatus 200 has already passed may be removed.

Also, when the user U specifies and designates a plurality of segments and a cleaning order of the plurality of segments, the remote apparatus controller 130 or the main apparatus controller 230 may set a movement path according to the designated cleaning order and the remote apparatus user interface 110 may display the set movement path.

Also, when the user U specifies and designates only a plurality of segments, the remote apparatus controller 130 or the main apparatus controller 230 may automatically set a movement path and the remote apparatus user interface 110 may display the set movement path. For example, the remote apparatus controller 130 or the main apparatus controller 230 may set priorities of the segments in order of segments adjacent to the main apparatus 200 and may set a movement path according to the priorities.

FIG. 21 is view illustrating another screen displayed by the remote apparatus user interface of the cleaning robot according to another embodiment.

Referring to FIG. 21, the remote apparatus user interface 110 may additionally display a position DS of a docking station on a generated map image or a plan view 173. Also, when the "room/recharging base position" icon described above with reference to FIG. 7a is selected, the remote apparatus user interface 110 may display a screen for designating the divided zones Z1, Z2, Z3, and Z4 as a bedroom1, a bedroom2 and the like in a map image or a plan view and may display a screen for designating the position DS at which the docking station is positioned.

Although technical concept has been exemplarily described above, it should be appreciated that various modifications, changes, and substitutions may be made by one of ordinary skill in the art without departing from the intrinsic characteristics. Accordingly, the embodiments disclosed above and the attached drawings are not intended to define the technical concept but to describe and the scope of the technical concept is not limited to the embodiments and the attached drawings. It should be understood that the scope is defined by the following claims and equivalents thereof are included in the scope of the present invention.

The invention claimed is:

1. A cleaning robot comprising:
    a sensor configured to sense obstacle information; and
    a controller configured to generate a map based on sensed values obtained by the sensor, analyze a structure of the generated map by detecting a region segmentation point from the map, and generate a map image based on an analysis result,
    wherein the controller is configured to detect a detection point along a frame edge as the region segmentation point in response to the detection point passing a narrow section whose width is less than a reference value, and
    wherein the controller is configured to determine a plurality of segments included in the map based on the region segmentation point, the plurality of segments corresponding to a plurality of separate spaces of a target space where the cleaning robot moved.

2. The cleaning robot of claim 1, wherein the controller is configured to substitute each of the segments with a figure, and generate the map image by combining a plurality of figures corresponding to the plurality of segments.

3. The cleaning robot of claim 1, wherein the controller comprises a structure analyzer, the structure analyzer comprising:
    a frame generator configured to form a frame of the map,
    an edge processor configured to remove an unnecessary edge of one or more edges included in the frame and distinguish a central node of the frame from another node, and
    a region segmentation point detector configured to detect the region segmentation point formed between the central node and the other node based on a processing result of the edge processor and the sensed values obtained by the sensor.

4. The cleaning robot of claim 3, wherein when the region segmentation point is detected, the region segmentation point detector is configured to distinguish one or more pixels formed toward the other node from the region segmentation point as one segment.

5. The cleaning robot of claim 3, further comprising a map processor configured to arrange an external shape of the map to be uniform.

6. The cleaning robot of claim 3, wherein the controller further comprises a region segmenter configured to determine a plurality of segments included in the map based on the structure of the map analyzed by the structure analyzer.

7. The cleaning robot of claim 6, wherein the controller further comprises a postprocessor configured to substitute each of the segments with a preset figure based on information with respect to the segments.

8. The cleaning robot of claim 1, wherein the controller is configured to detect a plan view corresponding to the generated map and generate another map based on the corresponding plan view.

9. A cleaning robot comprising:
a sensor configured to sense obstacle information; and
a controller configured to generate a map based on sensed values obtained by the sensor, analyze a structure of the generated map by detecting a region segmentation point from the map, and generate a map image based on an analysis result,
wherein the controller is configured to detect the region segmentation point based on a width of a section formed by one or more pixels, which are displayed as not having an obstacle, while moving a detection point along a frame edge from a branch node to a leaf node among a frame of the map along a frame edge.

10. The cleaning robot of claim 9, wherein while moving the detection point, the controller is configured to detect the detection point as the region segmentation point when the one or more pixels displayed as not having the obstacle form a section having a width less than a reference value.

11. The cleaning robot of claim 9, wherein while moving the detection point, when the one or more pixels displayed as not having the obstacle passes from the section having the width less than a reference value to a section having a width of the reference value or more, the controller is configured to detect a detection point corresponding to the section having the width less than the reference value as the region segmentation point.

12. The cleaning robot of claim 9, wherein the controller is configured to determine a width in at least one of a horizontal direction, a perpendicular direction, or an arbitrary angular direction of the one or more pixels as the width of the section based on a movement direction of the detection point.

13. The cleaning robot of claim 9, wherein the controller is configured to determine a width in at least one of a horizontal direction, a perpendicular direction, or an arbitrary angular direction of the one or more pixels as the width of the section based on the detection point.

14. The cleaning robot of claim 9, wherein the controller is configured to form the frame of the map and move the detection point outward from a center of the frame.

15. A cleaning robot comprising a non-transitory storage medium in which at least one program is stored and a controller configured to display a map image by executing the at least one program,
wherein the at least one program comprises commands for executing operations of:
receiving a map generation command input from a user;
receiving a map image from a main apparatus; and
displaying the map image,
wherein the map image comprises information on a region segmentation point and a plurality of segments generated based on a result of detecting an obstacle by the main apparatus, the plurality of segments corresponding to a plurality of separate spaces of a target space where the cleaning robot moved, and
wherein a detection point along a frame edge is detected as the region segmentation point in response to the detection point passing a narrow section whose width is less than a reference value.

16. The cleaning robot of claim 15, wherein the map image comprises a combination of preset figures.

17. The cleaning robot of claim 15, wherein the displaying of the map image comprises displaying a position of the main apparatus.

18. The cleaning robot of claim 15, wherein the at least one program further comprises a command for executing an operation of receiving a selection of a user about a random segment of a plurality of such segments displayed on the map image and moving the main apparatus to the selected segment.

19. A method of controlling a cleaning robot, comprising:
sensing obstacle information;
generating a map based on the sensed obstacle information;
analyzing a structure of the map by detecting a region segmentation point and a plurality of segments from the map, the plurality of segments corresponding to a plurality of separate spaces of a target space where the cleaning robot moved; and
generating a map image based on the structure of the map,
wherein the detecting a region segmentation comprises detecting a detection point along a frame edge as the region segmentation point in response to the detection point passing a narrow section whose width is less than a reference value.

* * * * *